United States Patent
Lyhne

(10) Patent No.: US 10,527,294 B2
(45) Date of Patent: Jan. 7, 2020

(54) CONTROL OF A PUMP TO OPTIMIZE HEAT TRANSFER

(71) Applicant: Grundfos Holding A/S, Bjerringbro (DK)

(72) Inventor: Casper Hillerup Lyhne, Viborg (DK)

(73) Assignee: Grundfos Holding A/S, Bjerringbro (DK)

( * ) Notice: Subject to any disclaimer, the term of this patent is extended or adjusted under 35 U.S.C. 154(b) by 778 days.

(21) Appl. No.: 15/029,309

(22) PCT Filed: Oct. 14, 2013

(86) PCT No.: PCT/DK2013/050330
§ 371 (c)(1),
(2) Date: Apr. 14, 2016

(87) PCT Pub. No.: WO2015/055203
PCT Pub. Date: Apr. 23, 2015

(65) Prior Publication Data
US 2016/0238261 A1    Aug. 18, 2016

(51) Int. Cl.
*F24D 19/10*    (2006.01)
(52) U.S. Cl.
CPC ..... *F24D 19/1009* (2013.01); *F24D 19/1051* (2013.01); *F24D 19/1054* (2013.01); *F24D 19/1057* (2013.01); *Y02B 10/20* (2013.01)
(58) Field of Classification Search
CPC ............. F24D 19/1009; F24D 19/1051; F24D 19/1054; F24D 19/1057; Y02B 10/20
(Continued)

(56) References Cited

U.S. PATENT DOCUMENTS 5,129,264 A * 7/1992 Lorenc .............. F04D 15/0088
                                                            415/206
5,367,602 A * 11/1994 Stewart ................. F24D 17/02
                                                            237/2 B
(Continued)

FOREIGN PATENT DOCUMENTS

CN        202119007 U       1/2012
CN        103299076 A       9/2013
(Continued)

OTHER PUBLICATIONS

Machine translation of CN103299076A by Lexis Nexis Total Patent on Jun. 26, 2018.
(Continued)

*Primary Examiner* — Brian W Wathen
*Assistant Examiner* — Christopher W Carter
(74) *Attorney, Agent, or Firm* — Woodard, Emhardt, Henry, Reeves & Wagner, LLP

(57) ABSTRACT

The present invention relates to a method for controlling a pump for feeding fluid (F) into a heating system (1000). The heating system has a hot fluid tank (HFT) receiving fluid from an associated fluid reservoir line (5) with an incoming fluid mass flow rate ($dm_{cw}/dt$). A pump (P) receives fluid from the line, and pumps the received fluid with a mass flow rate ($dm_c/dt$). A heat exchanging unit (HX) transfers heat (Q) to the fluid (F) from a medium (R). The transferred heat (Q) is maximized by controlling the pump (P1) in response to this information indicative of the transferred heat (Q), the fluid mass flow rate delivered by the pump thereby having a minimum as a function of the incoming fluid mass flow rate ($dm_{cw}/dt$) when maximizing the transferred heat. The invention provides significantly improved heat transfer to the fluid and power savings for the pump. The invention also relates to a heating system, e.g. a heat pump system.

24 Claims, 19 Drawing Sheets

(58) Field of Classification Search
USPC .......................................................... 700/282
See application file for complete search history.

(56) References Cited

U.S. PATENT DOCUMENTS

| | | | | |
|---|---|---|---|---|
| 2010/0089339 | A1* | 4/2010 | Krause | F24D 17/0078 122/19.1 |
| 2011/0282498 | A1* | 11/2011 | Freudenberger | F24D 11/003 700/282 |
| 2014/0208730 | A1* | 7/2014 | Kraft | F15B 1/022 60/327 |
| 2014/0263682 | A1* | 9/2014 | Marte | F24H 4/04 237/2 B |

FOREIGN PATENT DOCUMENTS

| | | |
|---|---|---|
| DE | 202005013499 U1 | 12/2005 |
| WO | WO 1993/007424 A1 | 4/1993 |
| WO | WO 2009/142004 A1 | 11/2009 |

OTHER PUBLICATIONS

Machine translation of CN202119007U by Lexis Nexis Total Patent on Jun. 26, 2018.

Machine translation of DE2005013499U1 by Lexis Nexis Total Patent on Jun. 26, 2018.

* cited by examiner

US 10,527,294 B2

CONTROL OF A PUMP TO OPTIMIZE HEAT TRANSFER

FIELD OF THE INVENTION

The present invention relates to a method for controlling a pump for feeding fluid, e.g. city water, into a heating system so as to optimize heat transfer in a heat exchanger. The invention also relates to a corresponding heating system.

BACKGROUND OF THE INVENTION

In many facilities there is a need for providing heated water, e.g. in homes, work places, factories. In large facilities it is often an advantage to use a heat pump, which produces both cold and hot water for HVAC systems in e.g. hotels. It is meant to replace the boiler in the building where it is installed, or at least save fossil fuels.

A particular problem is that the demand for hot water in for example a hotel varies greatly during the day. See for example FIG. 1 of the present application where a typically hot water consumption profile of a large facility is shown during 24 hours.

In order to meet the hot water demand, heat pump systems with three interconnected heat exchangers are known. They are called 'tri-lobe' heat pumps designed to optimize the coefficient of performance for the heat pump system. Such a tri-lobe heat pump system is for example shown in German utility model DE 20 2005 013 499, where a refrigeration cycle for a heat pump comprising an evaporator and an expansion valve, a compressor, and three capacitors or condensers are arranged therein and forming part of the refrigerant circuit or line.

Despite carefully considerations when designing a tri-lobe based heat pump system, it is nevertheless difficult in practise to fulfil the demand represented by a typically irregular demand cycle, cf. FIG. 1, and at the same time maintain a high coefficient of performance (COP) for the overall heat pump system in order to save energy.

International patent application WO 93/07424 (to Egmont Bartl) discloses a plant for recuperating heat from waste water. The waste water flows through a heat exchanger which is also connected to a hot water tank. The temperature differences between the inlet of waste water and outlet of heated water, and the outlet of waste water and the inlet of water to be heated, respectively, are measured and applied for optimizing heat exchange by varying corresponding supply pumps on both the primary and the secondary side of the heat exchanger so as to keep the temperature differences at an equal level. However, simulations performed by the present inventor shows that the applied control algorithm of WO 93/07424 results in a sub-optimum heat exchange, and a corresponding low COP.

Hence, an improved method for controlling a pump for feeding fluid, e.g. city water, into a heating system would be advantageous, and in particular a more efficient and/or reliable method would be advantageous.

OBJECT OF THE INVENTION

It is a further object of the present invention to provide an alternative to the prior art.

In particular, it may be seen as an object of the present invention to provide a method for controlling a pump for feeding fluid, e.g. city water, into a heating system that solves the above mentioned problems of the prior art with optimum performance of a heating system under irregular demands for heated fluid.

SUMMARY OF THE INVENTION

Thus, the above described object and several other objects are intended to be obtained in a first aspect of the invention by providing a method for controlling a pump for feeding fluid into a heating system, the heating system comprising:

a hot fluid tank (HFT), the hot fluid tank receiving fluid from an associated fluid reservoir line with an incoming fluid mass flow rate ($dm_{cw}/dt$), a pump, the pump also receiving fluid from the said fluid reservoir line, and pumping the received fluid with a variable mass flow rate ($dm_c/dt$), the pump and the hot fluid tank receiving fluid from a common junction on said associated fluid reservoir line, and a heat exchanging unit, the heat exchanging unit receiving fluid from the associated fluid reservoir line driven by the pump, and transferring heat to the fluid from a medium, the method comprises providing information indicative of a transferred heat in the heat exchanging unit to the fluid, the method being characterized in that the said transferred heat is maximized by controlling the pump in response to said information indicative of the transferred heat to the fluid at least within a finite interval of incoming fluid mass flow rate ($dm_{cw}/dt$), the fluid mass flow rate ($dm_c/dt$) delivered by the pump thereby having a minimum as a function of the incoming fluid mass flow rate ($dm_{cw}/dt$) when maximizing the transferred heat in said finite interval.

The invention is particularly, but not exclusively, advantageous for obtaining a significant and impressive improvement of heat transfer in a heat exchanger or heat exchanging unit, in particular the coefficient of performance (COP) of e.g. heat pump systems is improved by approximately 8% improvement in some typical situations. By varying the mass flow rate delivered by the pump, it is possible to control whether to take fluid, e.g. water, from the hot fluid tank into the heat exchanging unit or not. The dilemma is whether the pump flow should be increased to have more flow than the incoming fluid, e.g. city water, and thereby mixing fluid from the hot fluid tank in? Alternatively, should the flow be decreased so only fluid from the fluid reservoir line enters the heat exchanging unit, which is typically colder, but with the risk of too low flow? The present invention provides a solution to this dilemma. Essentially, it depends on what is most important to the heat exchanging unit at the given moment. If the temperature of the fluid pumped by the pump is more important, the flow is decreased, and if flow from the pump is more important, the flow is increased. Instead of running at a constant flow, the pump may match the incoming fluid flow, e.g. city water flow, to its best ability; however it preferably never goes below a certain flow.

Hitherto prior art systems have typically had a sub-optimal combination of flow and temperature through the heat exchanger. This causes a reduced heat transfer rate in the heat exchanger, and thus causes a higher condensation temperature and/or less sub-cooling of the refrigerant in the heat exchanger, which in turn leads to the reduced COP. It is not trivial to select the optimal flow as the flow and temperature are mutually dependent and both affect the heat transfer rate of the heat exchanger, but the present invention provides an advantageous control of the pump as compared to the prior art. This will be substantiated in more detail below, cf. in particular FIGS. 7 and 8 and the corresponding description.

It should be noted that the present invention, in addition to the improvement of COP for the heat pump has the further advantage of resulting in quite significant power savings for the pump supplying the heat exchanging unit with fluid due to the reduced flow under certain conditions. In some situations, simulations performed by the inventor have indicated up to a remarkable 90% reduction in power consumption of the pump.

The minimum of the fluid mass flow rate delivered by the pump may be interpreted as a mathematical minimum with a zero derivative in a point, though for practical purposes the minimum may have some quite limited extension.

The term 'maximized' or 'maximizing' (of the heat transfer) is be understood and interpreted in a broad manner. Thus, when working with heating systems in practice, it is well known that such system cannot be expected to be—at all times—at the ideal maximized condition, rather it is to be understood that—when implementing the present invention—there will be constant strive towards such a maximum of transferred heat. In one particular case, maximizing may be interpreted to be interpreted as optimizing with respect to highest value of heat transfer. In another particular case, the term 'maximizing' may of course be interpreted in the special mathematical meaning of maximizing i.e. finding a maximum of a particular mathematical function, i.e. a function or model of the transferred heat, as it will be explained below.

In the context of the present invention, the term "heating system" is to be interpreted broadly as a system capable of heating a fluid via a heat exchanging unit, directly or indirectly, and storing the fluid. Heating systems includes, but is not limited to, a heat pump system, a condensing boiler heating system, a solar-based heating system, etc. The heated fluid can be stored in a hot fluid tank, which may be one, or more than one, fluid storing entities, alternatively a reservoir-like system for storing the heated fluid may be applied in the context of the present invention.

In the context of the present invention, the term "heat pump system", or short 'heat pump', is to be interpreted broadly as a system wherein heat is transported from a heat source against a temperature gradient to a heat sink, i.e. against a spontaneous heat flow. To achieve this low-entropy energy, such as mechanical work, is applied, typically compression of a refrigerant. In particular, a heat pump system can be used both for cooling/refrigeration and heating purposes. A heat pump system can for example be applied for heating of water for domestic applications, or in a cooling system, e.g. an air condition system, or in combinations of such systems, e.g. HVAC (heating, ventilation, and air conditioning) systems.

In the context of the present invention, the term "heat exchanging unit", or short 'heat exchanger', is to be interpreted broadly as a unit wherein heat transfer is performed from one medium to another medium, e.g. from a refrigerant (working medium of heat pump) to a target medium such as water used in domestic applications for washing, showering, cleaning, etc. A heat exchanging unit typically has a solid wall serving the dual purpose of preventing mixing of one medium with the other, and facilitating thermal transfer of heat from one medium with the other medium. Depending on the application, heat exchanging units may have a compact design, e.g. with curled adjacent fluid lines.

In the context of the present invention, the term "refrigerant" is to be interpreted broadly as substances used in the cyclic process of a heat pump system, the refrigerant being capable of performing a reversible phase transition between liquid and vapour state. The thermodynamic properties of the refrigerant should preferably include one or more of the following properties: a boiling point properly chosen with respect to the target temperature, a high heat of vaporization, a moderate density in liquid form, a relatively high density in gaseous form, and, sometimes, a high critical temperature. The boiling point and gas density are directly dependent on pressure and hence the properties of refrigerants may be made more suitable for a particular application by changing the operating pressure. Desired properties of refrigerants are also non-corrosive or inert, non-flammable, and environmentally friendly. The refrigerant is some time called, or is equivalent with, a cooling medium or heating medium depending on the application.

In the context of the present invention, it is to be understood that the output delivered by a pump can be varied and controlled in several ways, as will be readily appreciated by the skilled person in pump technology. Hence, when referring to a "mass flow rate" it is to be interpreted in a broad manner, and being closely related to other similar operating parameters associated with a pump e.g. a differential pressure of fluid, or a flow rate, outputted from the pump, etc. In particular, the rotational speed of a centrifugal pump may typically be applied to vary the outputted mass flow rate of fluid from the pump as it will be appreciated by a skilled person in pump technology.

More generally, the mass flow rate through a pump may be controlled by the following non-limiting means: controlling the rotational speed of an impeller of a centrifugal pump, controlling the state of a throttle valve positioned at the inlet and/or outlet of the pump, controlling the geometry of the outlet diffuser of the pump, and controlling the geometry of the blade of an impeller of a centrifugal pump. Further, a centrifugal pump may comprise a number of stages each comprising one or more separate impellers and the mass flow through such a pump may be controlled by in or out coupling one or more of such impellers. These means may each be combined with each other.

The present invention is not limited to any particular kind of pump as will be understood by the skilled person in pump technology once the general teaching and principle of the invention is comprehended. Specifically, a centrifugal pump may be applied, the rotational speed u of the impeller being a suitable operating parameter for such a pump.

In the context of the present invention, the concept of a "fluid reservoir line" is to be interpreted broadly as a source of fluid being effectively of a significantly larger capacity than the hot fluid tank during normal operating conditions. Thus, for practical purposes the fluid reservoir line may be treated as an indefinitely large source of fluid. One particular non-limiting example may be a city water line, or municipal water line, provided by the water supply system of a city or a town. By the term 'associated' in front of the term 'fluid reservoir line' as defined by the method according to the invention, it is intended to emphasize that the fluid reservoir line does not form part of the heating system, but the entities are in fluid connection with each other.

In the context of the present invention, more than one fluid reservoir line, e.g. city water line, may be connected to the heating system. In one example, at least two sources of fluid lines are connected to the heating system.

The concept of coefficient of performance (COP or sometimes CP) of a heat pump system is generally defined as the ratio of heating, or cooling, provided over the mechanical energy consumed thereby as it will be familiar to the skilled person in thermodynamics. Notice that the coefficient is normally calculated for an overall heat pump system not for a part of the heat pump system. Theoretical concepts and expressions are available that may easily be implemented for a specific heat pump system. In practise, one often has a specific target temperature (or range of temperatures) of a system part, which, for the specific system and operating parameters, is calibrated or calculated to yield the optimum COP. Thus, by measuring such a temperature an operational measure of the current COP can be obtained. As it will be appreciated by the skilled person within heat pump technology, other operational parameters related to the COP may be applied in the context of the present invention.

In one advantageous embodiment, the heat transfer may also be maximized outside of said finite interval by operating the pump at the maximum of fluid mass flow rate ($dm_c/dt,max$) deliverable by the pump, the invention thereby being beneficial for optimum heat transfer over a larger range. It may be mentioned that the maximum of fluid mass flow rate ($dm_c/dt,max$) deliverable by the pump may be constrained by the pump itself, and/or by external parameters setting an effective limit on the maximum.

In another advantageous embodiment, controlling the pump at said maximum of heat transfer—at the lower end of said interval—may result in a mass flow rate ($dm_c/dt$) which is decreasing as a function of the incoming fluid mass flow rate ($dm_{cw}/dt$), and the resulting mass flow rate being larger than the incoming fluid mass flow rate thereby resulting in a back flow of heated fluid from the hot fluid tank through the said common junction, which results in improved heat transfer at this particular part of the said interval.

In yet another advantageous embodiment, controlling the pump at said maximum of heat transfer—at the higher end of said interval—may result in an increasing mass flow rate ($dm_c/dt$) as a function of the incoming fluid mass flow rate ($dm_{cw}/dt$) yielding an improved heat transfer at this other particular part of the said interval. Preferably, it may result in an increasing mass flow rate ($dm_c/dt$) being substantially the same as the incoming fluid mass flow rate ($dm_{cw}/dt$).

In one particular embodiment, providing information indicative of a transferred heat in the heat exchanger to the fluid may be performed based on input from at least two temperature sensors at an inlet and/or an outlet of the heat exchanging unit at the primary side and/or at the secondary side of said heat exchanging unit, which may provide easy access to a measure of the transferred heat.

In another particular embodiment, providing information indicative of a transferred heat in the heat exchanger to the fluid may be performed based on input from one or more temperature sensors at the inlet of and/or within the hot fluid tank, which may provide a direct measure of the heated fluid, and, for a temperature sensor at the inlet a possible indirect way of measuring flow.

In yet another particular embodiment, providing information indicative of a transferred heat in the heat exchanger to the fluid may be performed based on input from one or more flow meters, preferably for measuring the incoming fluid mass flow rate ($dm_{cw}/dt$) from said fluid reservoir line, and/or a medium mass flow rate ($dm_h/dt$) through the primary side of the heat exchanging unit, the flow meters having the advantage that direct and instant knowledge of the flow in the heating system may be obtained. In one embodiment, the pump may be applied as an indirect flow meter by utilising characteristics about the pump and one or more applied control parameters for operating the pump, thus utilising the pump twice.

In a preferred embodiment, providing information indicative of a transferred heat in the heat exchanger to the fluid may be performed based on input from one or more parameters related to the power consumption of the heating system, preferably a power consumption of a compressor compressing a refrigerant in a heat pump system, but other power consuming devices may also be exploited for this purpose.

In a particular embodiment, the maximization of transferred heat (Q) may advantageously be performed in a feed-forward control regime by solving the mass flow rate of the pump, $dm_c/dt$;

$$Q=f(T_{cw},T_t,T_h,dm_c/dt,dm_h/dt,dm_{cw}/dt,U,A,cp_c,cp_h)$$

wherein:

$T_{cw}$ is an estimated, or measured, temperature of the incoming fluid, $T_t$ is an estimated, or measured, temperature of fluid in the hot fluid tank, $T_h$ is an estimated, or measured, temperature of the medium at the inlet of the heat exchanging unit, $dm_c/dt$ is the mass flow rate delivered by the pump, $dm_h/dt$ is the mass flow rate of the medium at the inlet of the heat exchanging unit, $dm_{cw}/dt$ is the estimated, or measured, mass flow rate of the incoming fluid, U is the heat transfer coefficient per area of the heat exchanging unit, A is the effective area for heat transfer of the heat exchanging unit, $cp_c$ is the heat capacity of the fluid, and $cp_h$ is the heat capacity of the medium.

This has the advantage of allowing complete modelling of the heating system, and hence predictions may be made about future behaviour of the heating system.

In another embodiment, the maximization of transferred heat may be performed in a continuous feedback control regime by iteratively changing the mass flow rate ($dm_c/dt$) of the pump and monitoring the corresponding effect on the transferred heat, e.g. by two temperature sensors, which has the advantage of relatively simple implementation with a limited amount of sensors.

In yet another embodiment, the maximization of transferred heat may be performed in a logical feedback control regime by either operating the pump at the maximum rated mass flow rate ($dm_c/dt,max$), or operating the pump at a mass flow rate ($dm_c/dt$) equal to the incoming fluid flow mass rate ($dm_{cw}/dt$), the incoming fluid flow mass rate being estimated by either a flow meter in the fluid inlet line, and/or the flow direction being indirectly estimated based on a temperature sensor in between the said common junction and the hot fluid tank by comparison with the temperature of the incoming fluid, which is a particular beneficial implementation by avoiding the use of flow meters, and because the heating system is relative simple to control in this way. In an embodiment, an additional flow meter could alternatively be positioned between the common junction and the hot fluid tank, the flow meter could then preferably be a bi-directional flow meter.

In one advantageous embodiment, the maximization of transferred heat may be performed by changing the mass flow rate ($dm_c/dt$) of the pump and monitoring the corresponding effect on the transferred heat by averaging over a period of time sufficient to reach a steady state of transferred heat with respect to the mass flow rate of the pump, which allows for cancellation of transient in the transferred heat.

In one particular advantageous embodiment, the heating system may comprise a heat pump system, the heat pump system comprising a refrigerant line with said heat exchanging unit, a second, and a third exchanging unit being interconnected, the heat exchanging unit receiving fluid from the pump, and performing sub-cooling of a refrigerant so as to transfer heat to the fluid, the second heat exchanging unit performing super-heating of said refrigerant so as to transfer heat to the fluid, and the third heat exchanging unit receiving the refrigerant from said second heat exchanging unit and performing condensation of said refrigerant, and conveying the cooled refrigerant to the heat exchanging unit, which may particularly have a much improved coefficient of performance (COP) according to simulations made by the inventor.

In another embodiment, the heating system may comprise a condensing boiler system, the condensing boiler system comprising a condensing boiler unit where a combustion process together with a subsequent condensation of water from the combustion process is transferring heat to the fluid, the use of condensing boilers may facilitate further advantageous use of the present invention.

In yet another embodiment, the heating system may comprise a solar-based heating system, the solar-based heating system comprising a solar panel where solar radiation heats a medium being driven to the heat exchanging unit.

It may be noted that the heating system according to the present invention may have a combination of sub-heating systems integrated, e.g. a heat pump system combined with condensing boiler system, or a condensing boiler system combined with a solar-based heating system, and so forth. Similarly, the method for controlling the pump for feeding fluid into each of these sub-heating systems may utilise the present invention.

In many embodiments, the fluid may be city water, and the fluid reservoir line is a city water line as explained above.

In a second aspect, the present invention relates a method for controlling a pump for feeding fluid into a heating system, the heating system comprising:

a hot fluid tank, the hot fluid tank receiving fluid from an associated fluid reservoir line with a given incoming fluid mass flow rate ($dm_{cw}/dt$), a pump, the pump also receiving fluid from the said fluid reservoir line, and pumping the received fluid with a variable mass flow rate ($dm_c/dt$), the pump and the hot fluid tank receiving fluid from a common junction on said associated fluid reservoir line, and a heat exchanging unit, the heat exchanging unit receiving fluid from the associated fluid reservoir line driven by the pump, and transferring heat to the fluid from a medium, the method comprises providing information indicative of a transferred heat in the heat exchanging unit to the fluid, the method being characterized in that the transferred heat is maximized in response to the information indicative of the transferred heat by having a first interval where the pump is controlled to mix fluid from the fluid reservoir line and the hot fluid tank, and by having a second interval in which the pump only draws fluid from the incoming fluid reservoir line.

This aspect of the invention is particularly in that the minimum of not part of the invention. Instead, it is inter alia defined that the pump only draws fluid from the reservoir line.

In a third aspect, the present invention relates to a heating system comprising:

a hot fluid tank, the hot fluid tank receiving fluid from an associated fluid reservoir line with an incoming fluid mass flow rate ($dm_{cw}/dt$), a pump, the pump also receiving fluid from the said fluid reservoir line, and pumping the received fluid with a mass flow rate ($dm_c/dt$), the pump and the hot fluid tank receiving fluid from a common junction on said associated fluid reservoir line, and a heat exchanging unit, the heat exchanging unit receiving fluid from the associated fluid reservoir line driven by the pump and transferring heat to the fluid, and a control unit, the control unit being connected to the pump for variably controlling the mass flow rate ($dm_c/dt$), the control unit receives information indicative of a transferred heat in the heat exchanging unit to the fluid, characterized in that the said transferred heat is maximized by controlling the pump in response to said information indicative of the transferred heat to the fluid and at least within a finite interval of incoming fluid mass flow rate ($dm_{cw}/dt$), the fluid mass flow rate ($dm_c/dt$) delivered by the pump thereby having a minimum as a function of the incoming fluid mass flow rate ($dm_{cw}/dt$) when maximizing the transferred heat in said finite interval.

This aspect of the invention is particularly, but not exclusively, advantageous in that the heating system may be designed to encompass the various advantages facilitated by the invention, e.g. improved heat transfer and power saving in the pump.

In a fourth aspect, the invention relates to a computer program product being adapted to enable a computer system comprising at least one computer having data storage means in connection therewith to control an heating system according to the third aspect of the invention.

This aspect of the invention is particularly, but not exclusively, advantageous in that the present invention may be accomplished by a computer program product enabling a computer system to carry out the operations of the heating system of the second aspect of the invention when down- or uploaded into the computer system. Such a computer program product may be provided on any kind of computer readable medium, or through a network.

The individual aspects of the present invention may each be combined with any of the other aspects. In particular, the embodiments of the method according to the first aspect may readily be combined with the method according to the second aspect, and/or the heating system according to the third aspect as the skilled person will immediately understand from the present application. These and other aspects of the invention will be apparent from the following description with reference to the described embodiments.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
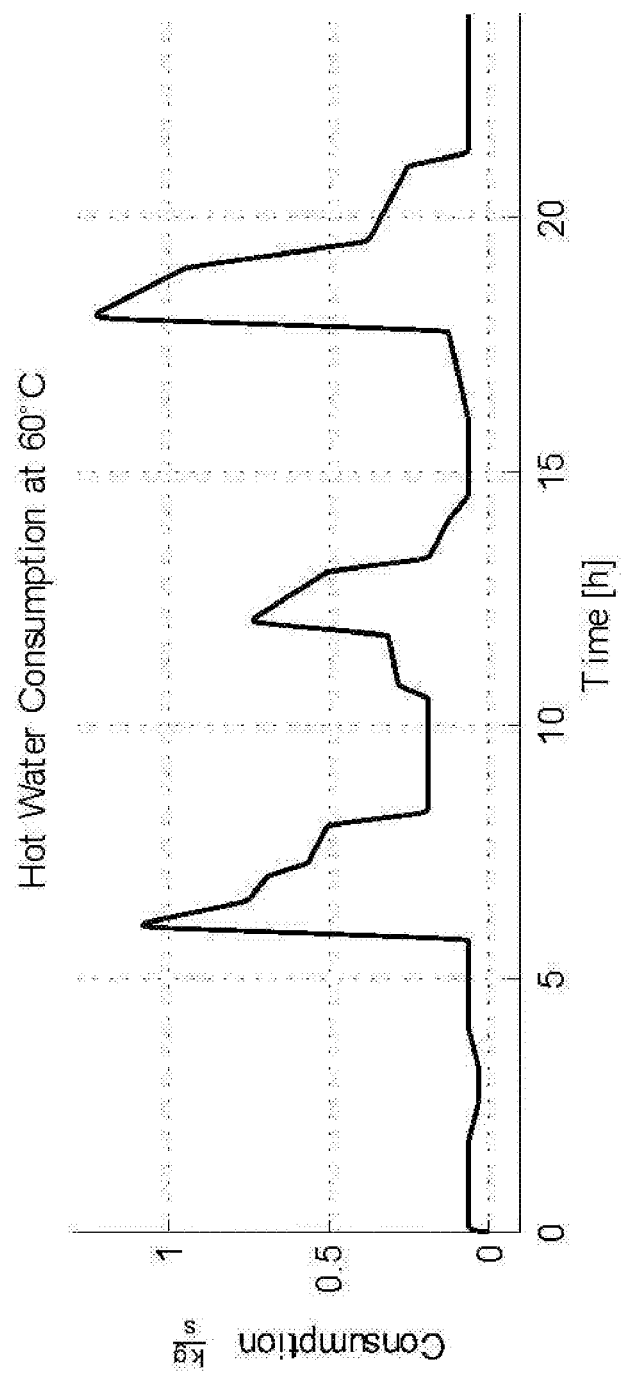
FIG. 1 is a graph showing the hot water consumption pattern during a day found in a typical hotel.

FIG. 1 is a graph showing the hot water consumption pattern during a day found in a typical hotel. All simulations below are performed with the same assumed consumption pattern which has the duration of 24 hours. The data is chosen somewhat arbitrarily, however, it is supposed to emulate the peaks in consumption found in a typical hotel. Significant peaks in the consumption reflect the hot water usage for showers in the morning and in the evening, whereas the noon peak reflects cooking. FIG. 1 shows the consumption profile in kg/s for hot water at 60 degrees Celsius (C). Whenever the tank temperature drops, the consumption is scaled such that the energy consumption from the tank relatively to 40 degrees C. is always the same. This allows comparison between simulations with different hot water tank temperatures. The rationale behind this is the assumption of a mixing temperature of 40 degrees C. after water has been withdrawn from the tank. The hot water tank in this modeled experiment is a perfectly mixed tank with a volume of 4000 liters. The tank is chosen relatively small so that peaks in consumption significantly affect the temperature of the tank. If the tank was very large the heating would be sufficient as long as its average power is more than the average consumption.

Figure 2:
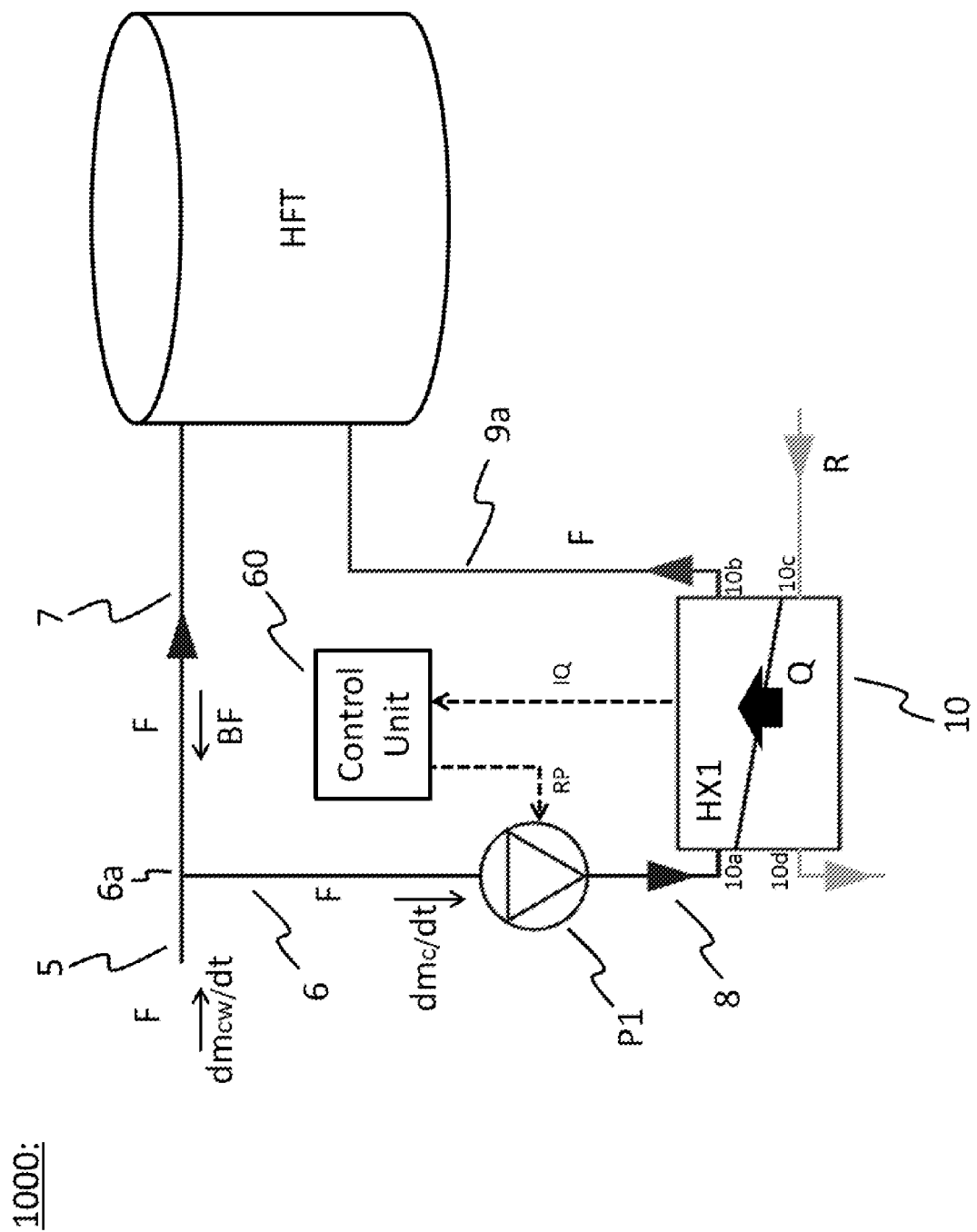
FIG. 2 is a schematic drawing of a portion of a general heating system according to the present invention.

FIG. 2 is a schematic drawing of a portion of a general heating system 1000 according to the present invention. A control unit 60 is controlling a pump P1 via control signal RP so as to feed, or pump, fluid F into the heating system 1000, the heating system comprising a hot fluid tank HFT, the hot fluid tank receiving fluid from a fluid reservoir line 5 with an incoming fluid mass flow rate, $dm_{cw}/dt$. The sub-annotation cw may, in a non-limiting meaning, be considered as an abbreviation for 'city water'.

The pump P1 is also receiving fluid from the said fluid reservoir line 5, e.g. a city water line with city water, and pumps the received fluid with a variable mass flow rate, $dm_c/dt$, as schematically indicated. Both the pump and the hot fluid tank are receiving fluid F from a common junction 6a on the fluid reservoir line. The common junction 6a enables back flow (schematically indicated by drawn arrow 'BF') through the fluid connection 7 from the hot fluid tank HFT to the pump P1 in some specific cases, as it will be explained in more detail below. Though various flow control means, e.g. valves, may be provided within the context of the heating system 1000 (not shown in FIG. 2), these flow control means should be controlled in a manner consistent with the present invention, e.g. allowing a back flow BF to take place under specific circumstances.

A heat exchanging unit HX1 is in fluid connection via fluid conduction means 6, e.g. a pipe, with the common junction 6a, the heat exchanging unit thereby receives fluid from the fluid reservoir line driven by the pump P1, and within the heat exchanging unit there is transferred heat Q (solid arrow) to the fluid F from a medium R, the medium could be a refrigerant when the heating system comprises a heat pump, cf. FIG. 3A and corresponding description below, or it could be a medium suitable for solar heating, cf. FIG. 3C and corresponding description below. In the embodiment shown, the fluid is heated in so-called counter flow, typically yielding the best heat transfer, with respect to the medium R as seen by opposing directions of flows through the heat exchanging unit HX1. The present invention have, however, also been demonstrated by simulations to work in a parallel flow configuration through the heat exchanging unit. The heat exchanging unit HX1 has inlet 10c and outlet 10d on the primary side, and has inlet 10a and outlet 10c on the secondary side. The pump is in fluid connection via fluid conductions means 8 with the inlet 10a on the secondary side.

As schematically indicated in FIG. 2, there is provided information IQ indicative of a transferred heat Q in the heat exchanging unit HX1 to the fluid F to the control unit 60. This information may be obtained in various ways, directly and indirectly, cf. FIG. 6 and corresponding description below. This may be performed e.g. by appropriately positioned temperature sensors as the skilled person would readily understand. After heating, the fluid is conveyed by fluid conduction means 9a, e.g. a pipe, to the hot fluid tank HFT for storage. In this embodiment, the fluid conduction means 9a is directly connecting the heat exchanging unit HX1 to the tank, but this is not always the case.

When controlling the pump P1, one is presented with a dilemma. The pump can be controlled so that the amount of fluid, i.e. $dm_c/dt$, into the heat exchanging unit HX1 10 can be determined; however, there is generally no control of how much incoming fluid enters the heating system 1000, i.e.

$dm_{cw}/dt$, because this is typically equal to the consumption of heated fluid from the hot fluid tank.

The invention is particular in that the transferred heat Q is maximized for an interval, or range, of fluid mass flow rate, $dm_c/dt$, by controlling the pump P1 in response to the information IQ indicative of the transferred heat Q to the fluid F at least within a finite interval of incoming fluid mass flow rate, $dm_{cw}/dt$, possibly in more than one interval incoming fluid mass flow rate. The fluid mass flow rate, $dm_c/dt$, delivered by the pump thereby has a minimum as a function of the incoming fluid mass flow rate, $dm_{cw}/dt$, when maximizing the transferred heat in this finite interval of incoming fluid facilitating the various advantages of the invention, e.g. significantly improved heat transfer to the fluid and power savings for the pump.

Figure 3A:
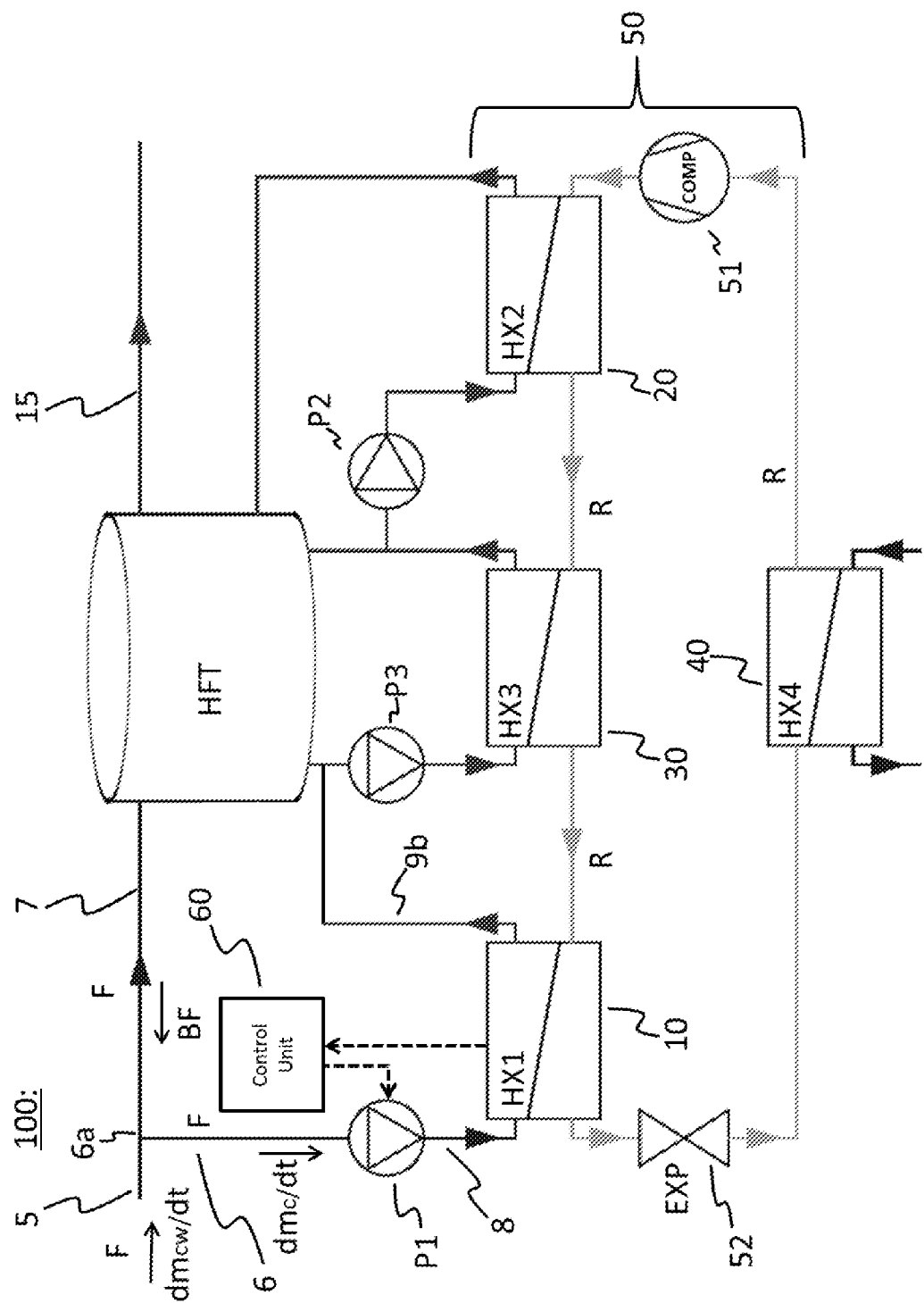
FIG. 3A is a schematic drawing of a heat pump system with three connected heat exchanging units according to the present invention.

FIG. 3A is a schematic drawing of a heat pump system 100 with three connected heat exchanging units HX1 10, HX2 20, and HX3 30, as schematically indicated. The fluid F is fed into the heat pump system 100 in the upper left corner in FIG. 3A using the principle explained in FIG. 2, the reference signs being the same and having the same technical meaning.

The heat pump system comprises a refrigerant line 50 where a refrigerant R is circulated as schematically indicated. Notice how each heat exchanger, HX1, HX2, and HX3, are supplied with fluid F from a corresponding pump, P1, P2, and P3, respectively. Such a heat exchanger configuration with three heat exchangers in series is often called a tri-lobe configuration, and similar configurations are known in the art, cf. U.S. Pat. No. 7,658,082, which is hereby incorporated by reference in its entirety.

The first heat exchanging unit HX1, a second heat exchanging unit HX2, and a third HX3 exchanging unit being interconnected provides an advantageous way of transferring heat from a source of heat entering the fourth heat exchanging unit HX4 40. After being heated, the refrigerant R is conveyed to a compressor COMP 51 where compression takes place as it is conventionally performed in a heat pump system. In the second heat exchanging unit HX2, there is subsequently performed super-heating of the refrigerant so as to transfer heat to the fluid F. Thereafter, the third heat exchanging unit HX3 receives the refrigerant from the second heat exchanging unit HX2 and performs condensation, partially or completely, of the refrigerant, and conveys the cooled refrigerant to the heat exchanging unit HX1.

The heat exchanging unit HX1 then receives the fluid F from the pump P1 according to the present invention, and thereby performs sub-cooling of the refrigerant R so as to transfer further heat Q to the fluid. After the sub-cooling, the refrigerant is conveyed to an expansion valve EXP 52, where the pressure is lowered, or throttled, before the refrigerant is conveyed back to the fourth heat exchanging unit HX4 again, and the refrigerant cycle in the heat pump system can be repeated.

Notice how the heated fluid in this embodiment is conveyed to the inlet of the third pump P3 by fluid conduction means 9b, e.g. a dedicated pipe, which is different from the embodiment in FIG. 2 where the heated fluid was conveyed directly to the hot fluid tank.

From the tank HFT, the heated fluid may be consumed i.e. conveyed away via fluid conduction means 15 in response to a demand for heated fluid.

Figure 3B:
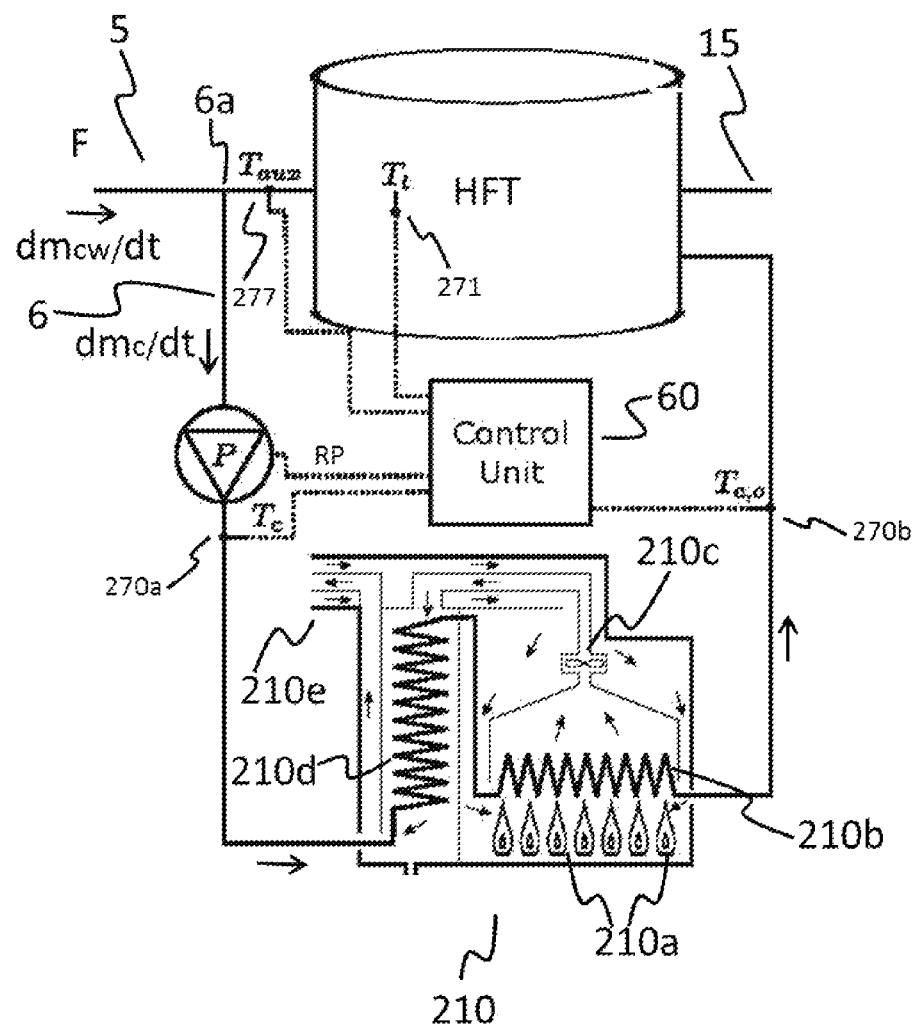
FIG. 3B is a schematic drawing of a portion of a heating system with a condensing boiler according to the present invention.

FIG. 3B is a schematic drawing of a portion of a heating system 200 with a condensing boiler 210 where the fluid F is fed into the condenser by controlling the pump P according to the present invention, the reference signs being again the same as in FIGS. 2 and 3A.

In the condensing boiler 210, a combustion process is performed, schematically indicated by multiple flames 210a. The combustion process heats the fluid conveyed through heat exchanger portion 210b. In the condenser boiler burned gas produces water vapour, which is conveyed with assistance from a fane 210c to a neighbouring heat exchanging portion 210d where condensation of the water vapour also heats the fluid F. In air openings 210e, fresh air for the combustion is conveyed to the combustion process, and cooled air after the condensation is conveyed out from the condenser boiler, as schematically indicated by the small air path arrows within the boiler.

Notice that the heating of the fluid through heat exchanger portion 210b may be seen as a transverse heat exchanging process, as opposed to a parallel or an anti-parallel process, the present invention has been useful for all of these configurations.

Heating system 200 measures the transferred heat to the fluid in the condenser boiler 210 by a temperature measurement by a temperature sensor 270a measuring the temperature of the fluid before, $T_c$, and by a temperature measurement by a temperature sensor 270b measuring the temperature of the fluid after the boiler, $T_{c,o}$. A temperature measurement in the tank HFT by a temperature sensor 271 measuring the temperature of the heated fluid, $T_t$, can be applied together with a temperature measurement by a temperature sensor 277 measuring the fluid temperature after the common junction, $T_{aux}$, for indirect flow measurement, or more specifically an indication of the flow direction. Thus, by comparing the fluid temperature after the common junction, $T_{aux}$, with the temperature in the tank, $T_t$, is it possible to provide a measure of the current flow direction, i.e. whether there is a back flow BF, or not.

Figure 3C:
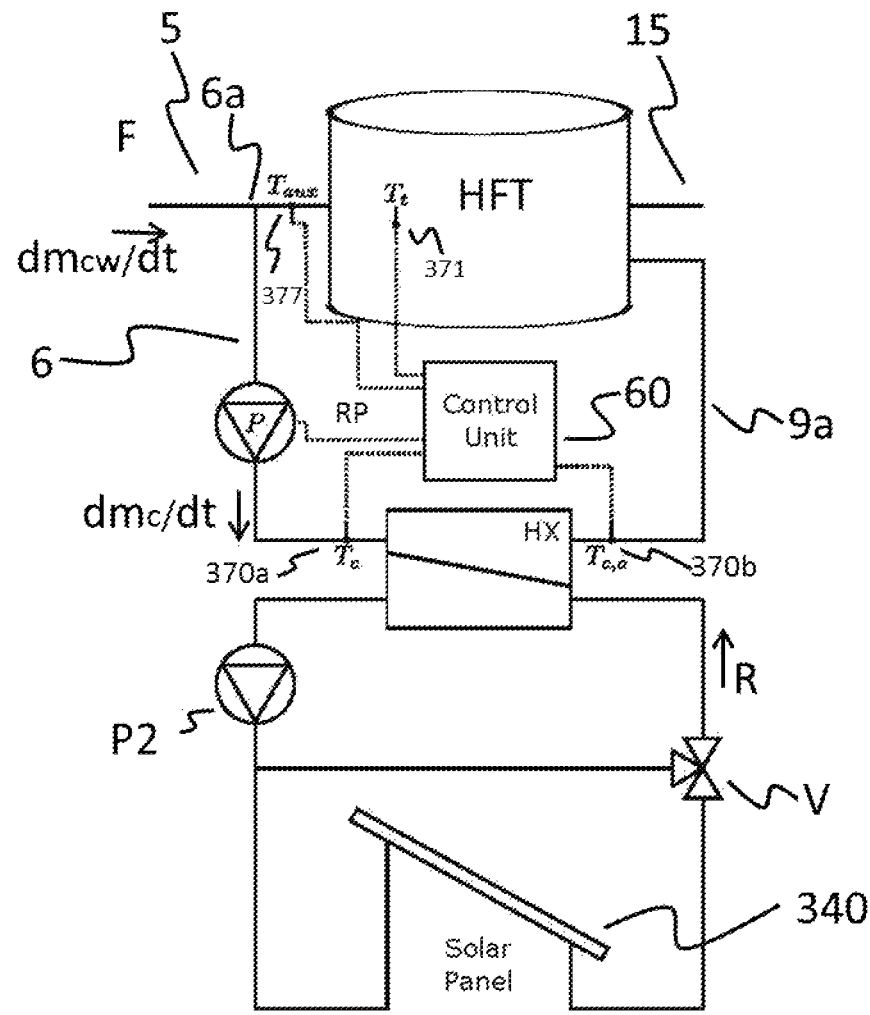
FIG. 3C is a schematic drawing of a portion of a heating system comprising a solar-based heating system according to the present invention.

FIG. 3C is a schematic drawing of a portion of a heating system 300 comprising in particular a solar-based heating panel 340 where fluid is conveyed into the heat exchanging unit HX by controlling the pump P according to the present invention, the same reference signs having again the same technical meaning as in FIGS. 2, 3A and 3B.

Like in FIG. 3B, temperature sensors 370a and 370b are applied to measure the transferred heat to the fluid, whereas temperature sensors 371 and 377 may be applied for obtaining an indirect measure of the back flow from the hot fluid tank HFT to the common junction 6a.

In the solar heating system 300, the pump P2 is continuously driving the medium R through the system, though the pump could be controlled in dependency on the amount of solar radiation. A bypass valve V is provided to be able to keep the temperature of fluid F after being heated in unit HX, $T_{c,o}$, below a certain level. If for example the fluid is city water being heated for domestic appliances, it may be beneficial to keep the temperature low enough to avoid limescale, i.e. precipitation of lime in the heat exchanging unit HX and the connected parts.

Figure 4:
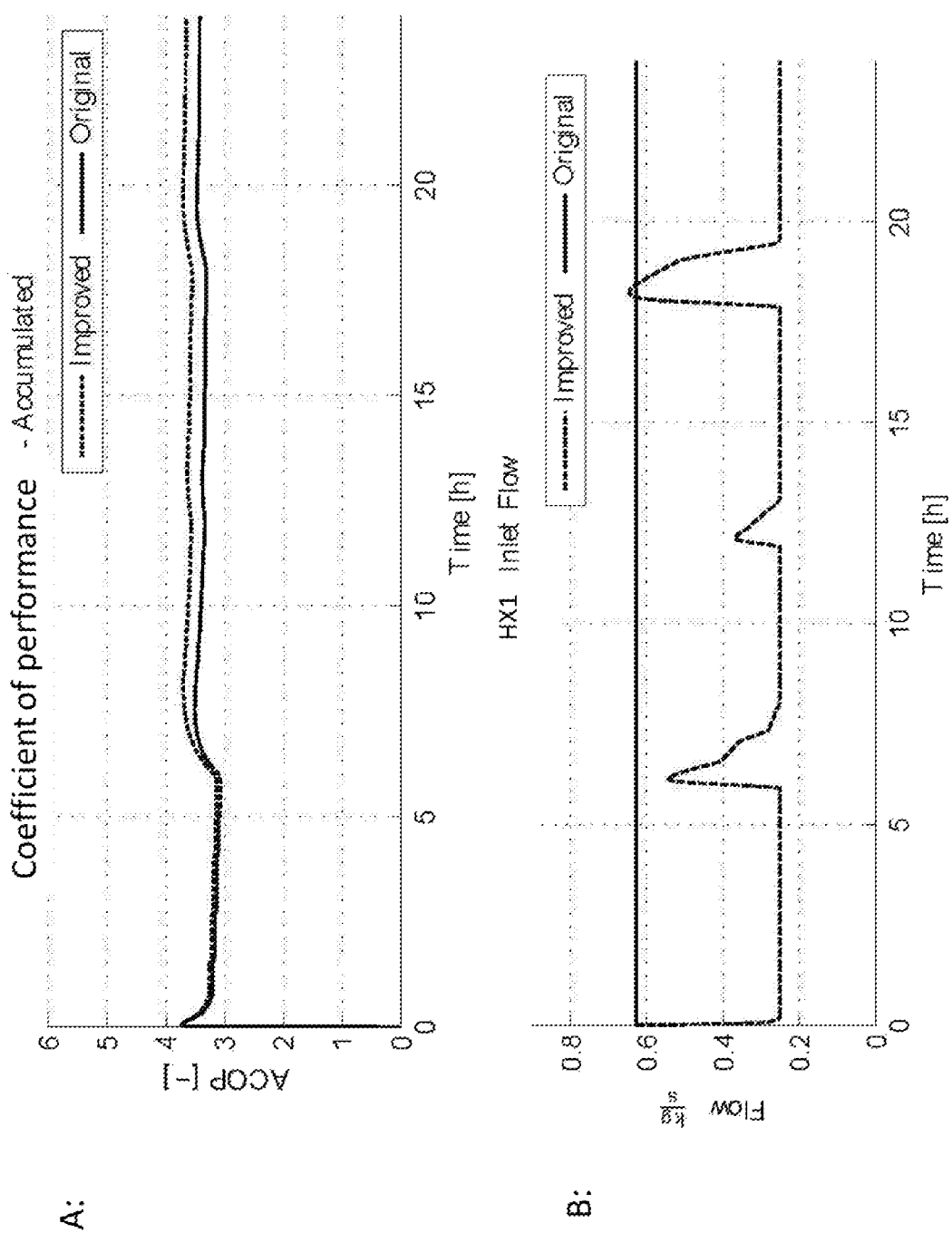
FIGS. 4A and 4B are graphs showing the modelled coefficient of performance (COP) of a heat pump system and the inlet fluid flow into the heat exchanging unit on the secondary side, respectively, according to the present invention.

FIGS. 4A and 4B are graphs showing the modelled coefficient of performance (COP) of a heat pump system 100 shown in FIG. 3A, and the inlet (reference 10a in FIG. 2) fluid flow into the heat exchanging unit HX1 on the secondary side, respectively, according to the present invention. The consumption profile of heated fluid i.e. water is the one shown in FIG. 1. With the present invention implemented, a COP improvement of around 7.3% is seen. It is clearly seen in FIG. 4B, that the flow is generally lower with the control algorithm according to the present invention ('Improved'). This also saves power on the corresponding pump. This saving is however not quantified in this graph.

Figure 5:
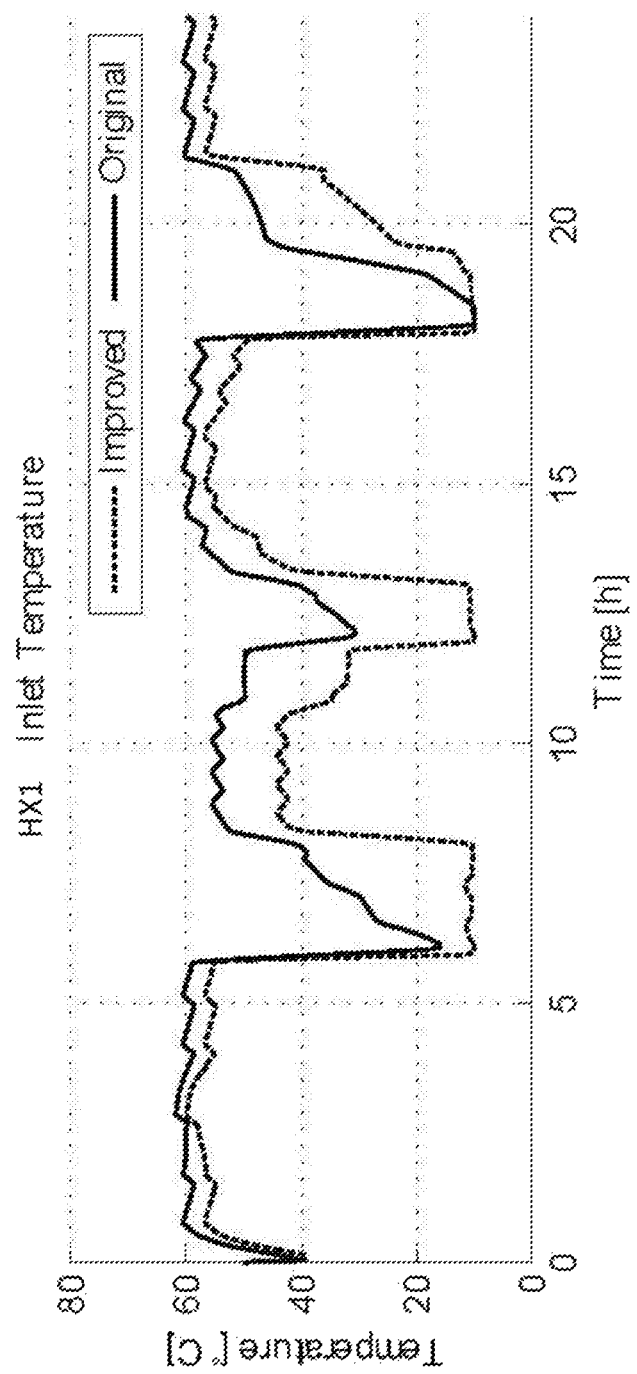
FIG. 5 is a graph showing the modelled inlet temperature of the fluid into the heat exchanging unit of a heat pump system on the secondary side according to the present invention.

FIG. 5 is a graph corresponding to FIG. 4B showing the modelled inlet temperature of the fluid, $T_c$, into the heat exchanging unit HX1 on the secondary side according to the present invention ('Improved'). The water temperature at the inlet of HX1 is significantly lower on average for the invention compared to the original curve where the pump is operated with a constant flow rate as seen in FIG. 4B. This is because less water from the hot fluid tank HTF is mixed into the water from the city water line 5 before entering the heat exchanging unit HX1, cf. FIG. 3A, when using the present invention.

Figure 6A:
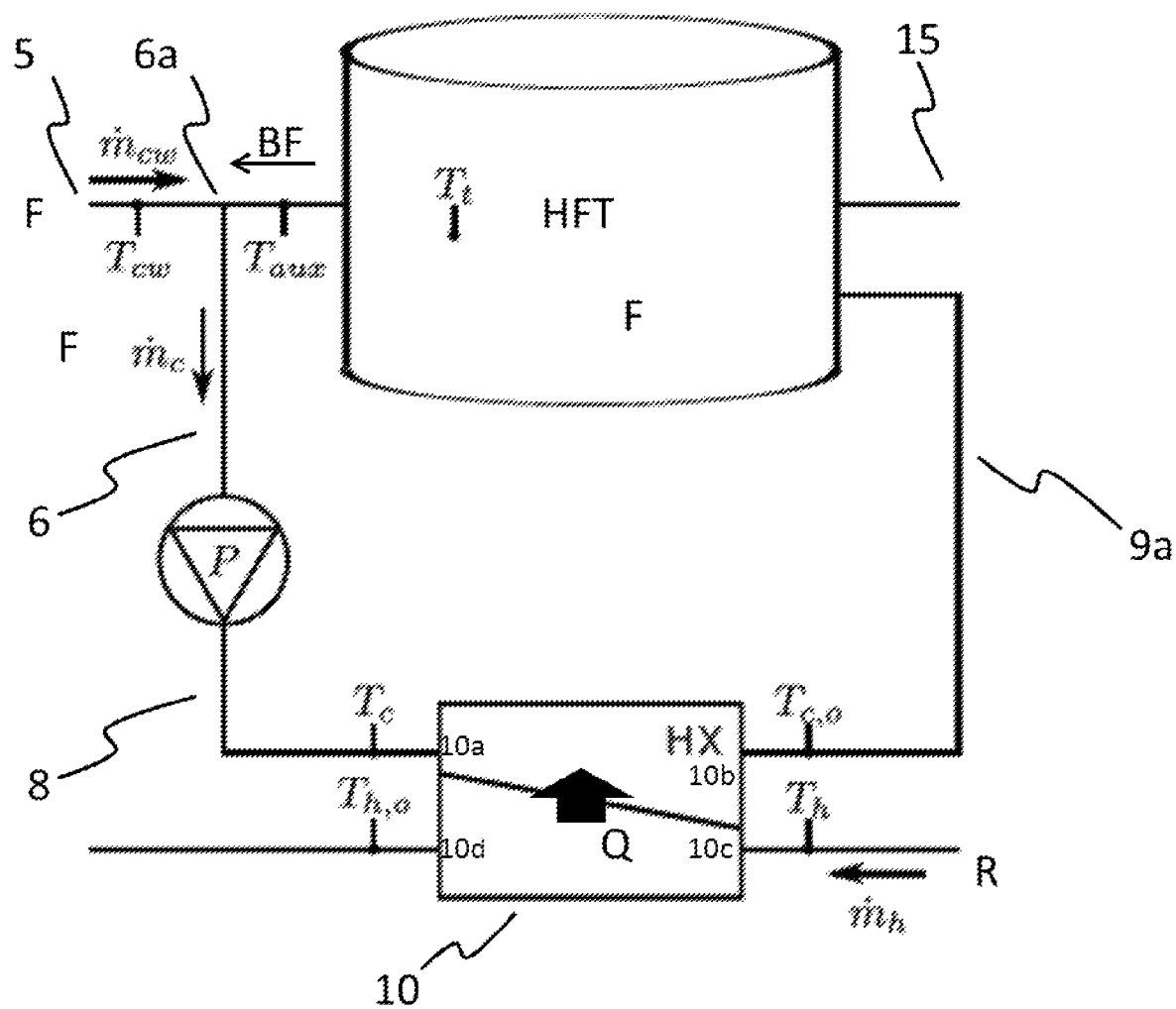
FIG. 6A is a schematic drawing of a portion of a heating system showing some suitable thermodynamic variables in the context of the present invention.
Figure 6B:
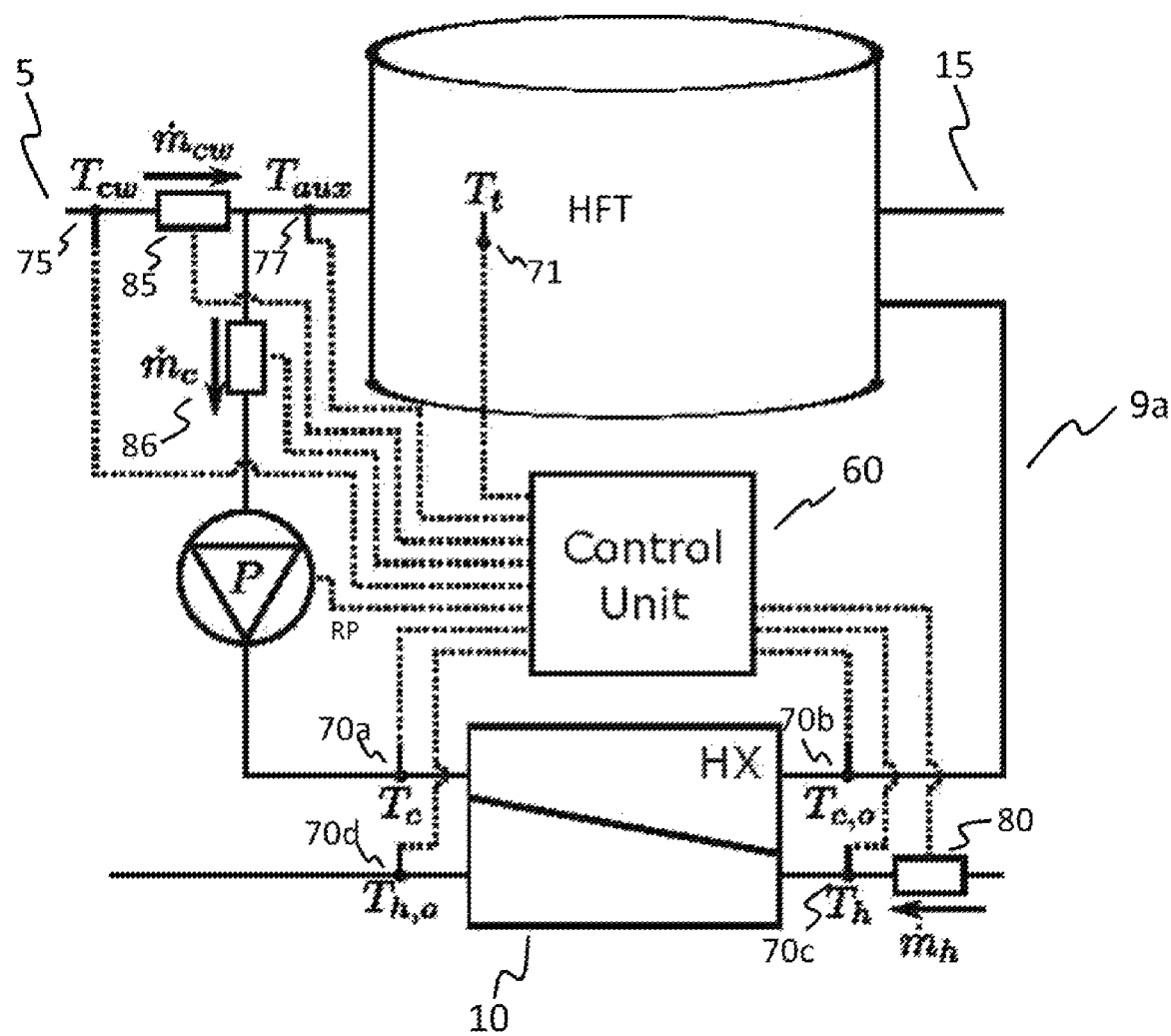
FIG. 6B is a schematic drawing corresponding to FIG. 6A with a control unit and a selection of measurement means according to the present invention.

FIG. 6A is a schematic drawing of a portion of a heating system 100 showing some suitable thermodynamic variables in the context of the present invention. The heating system could form part of heat pump system 100 like in FIG. 3A, or heating systems 200 or 300 shown in FIGS. 3B and 3C, respectively. FIG. 6B shows some measurement means, e.g. flow sensors and temperature sensors, for finding some of these variables. The reference signs correspond to the reference signs in the previous figures. In FIGS. 6A and 6B, the notation for $dm_{cw}/dt$ corresponds to $\dot{m}_{cw}$ and so forth, i.e. changing from Leibniz's notation for differentiation to Newton's notation for differentiation ('dot notation') with respect to time as the skilled person in mathematics will know.

The maximization of transferred heat Q can be performed by solving for the mass flow rate of the pump P, $dm_c/dt$;

$$Q=f(T_{cw}, T_t, T_h, dm_c/dt, dm_h/dt, dm_{cw}/dt, U, A, cp_c, cp_h)$$

where $T_{cw}$ is an estimated, or measured, temperature using sensor 75 of the incoming fluid F, $T_t$ is an estimated, or measured, temperature using sensor 71 of fluid F in the hot fluid tank HFT, $T_h$ is an estimated, or measured, temperature using sensor 70c of medium R at the inlet 10c of the heat exchanging unit HX, $dm_c/dt$ is the mass flow rate delivered by the pump measured using flow meter or sensor 86, $dm_h/dt$ is the mass flow rate of the medium R using flow meter 80 at the inlet of the heat exchanging unit HX, $dm_{cw}/dt$ is the estimated, or measured, mass flow rate using flow meter 85 of the incoming fluid, e.g. city water, U is the heat transfer coefficient per area of the heat exchanging unit HX, A is the effective area for heat transfer of the heat exchanging unit HX, $cp_c$ is the heat capacity of the fluid F, e.g. water, and $cp_h$ is the heat capacity of the medium R, e.g. a refrigerant.

It turns out that the heat transfer rate of the heat exchanger is not necessarily maximized by maximizing $dm_c/dt$ as this can also result in an increase in temperature due to mixing from the hot fluid tank HFT. Actually, the heat transfer rate is dependent on many variables as seen from the equation above. Thus, Q is a function of ten variables. However, only some of them actually varies under practical conditions. That is typically $T_{cw}$, $T_t$, $dm_c/dt$, $dm_h/dt$ and $dm_{cw}/dt$. Out of those only $dm_c/dt$ is controllable, and of the uncontrollable variables only $dm_{cw}/dt$ is expected to vary significantly, and also to a lower degree $T_t$ and $T_h$.

The aim is to maximize Q i.e. having the highest heat transfer possible. Since everything but $dm_c/dt$ is fixed, Q can only be maximized by means of changing $dm_c/dt$. For this embodiment, the parameters are—for purely illustrative purposes—fixed as follows:

$T_{cw}$=8 deg. C.
$T_t$=50 deg. C.
$T_h$=65 deg. C.
$dm_h/dt$=10 kg/s
U=2750 W/K m$^2$
A=6 m$^2$
$cp_c$=4182 J/kg K (i.e. water)
$cp_h$=4182 J/kg K (i.e. water)

Figure 7A:
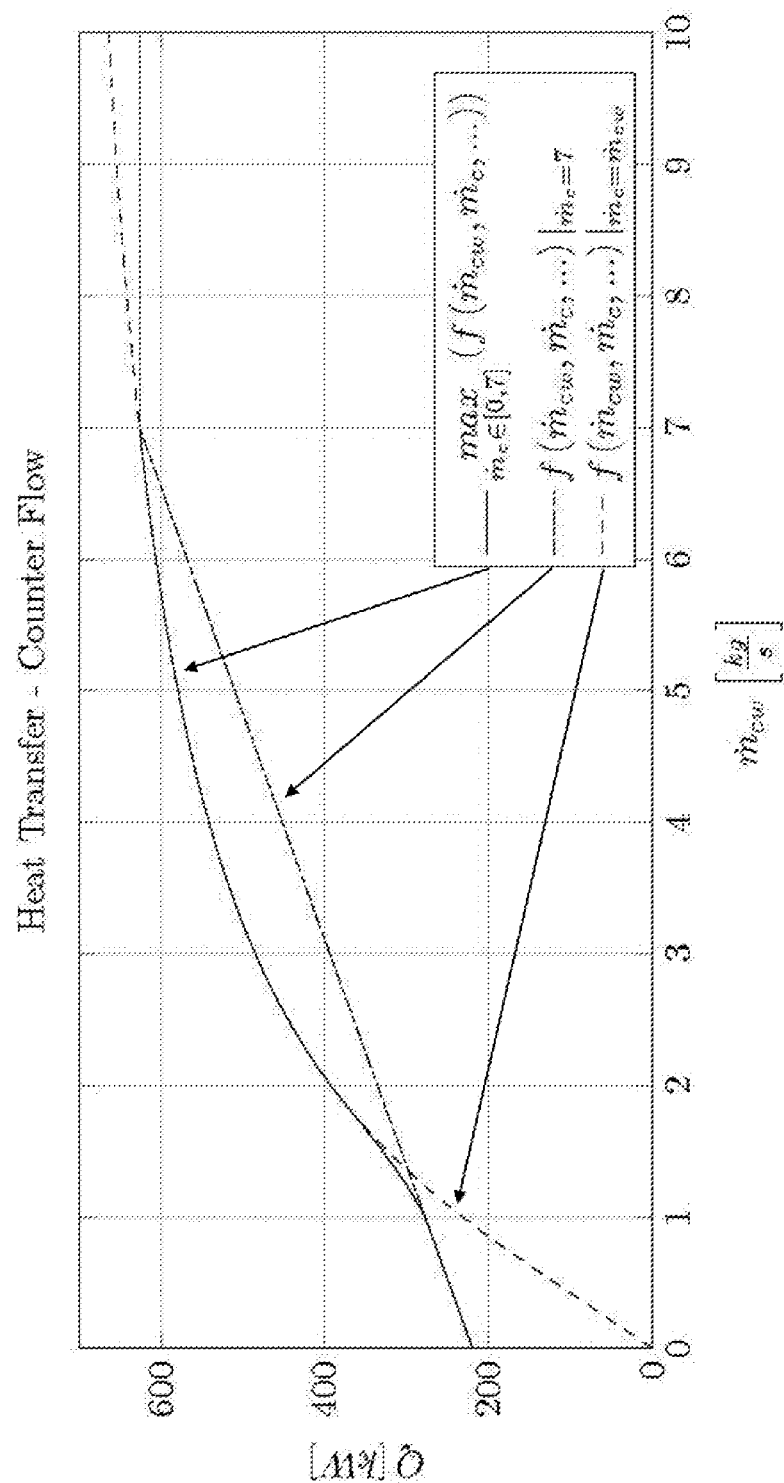
FIGS. 7A and 7B are graphs showing the modelled heat transfer, Q, as a function of the incoming fluid mass flow rate, $dm_{cw}/dt$, according to the present invention.
Figure 7B:
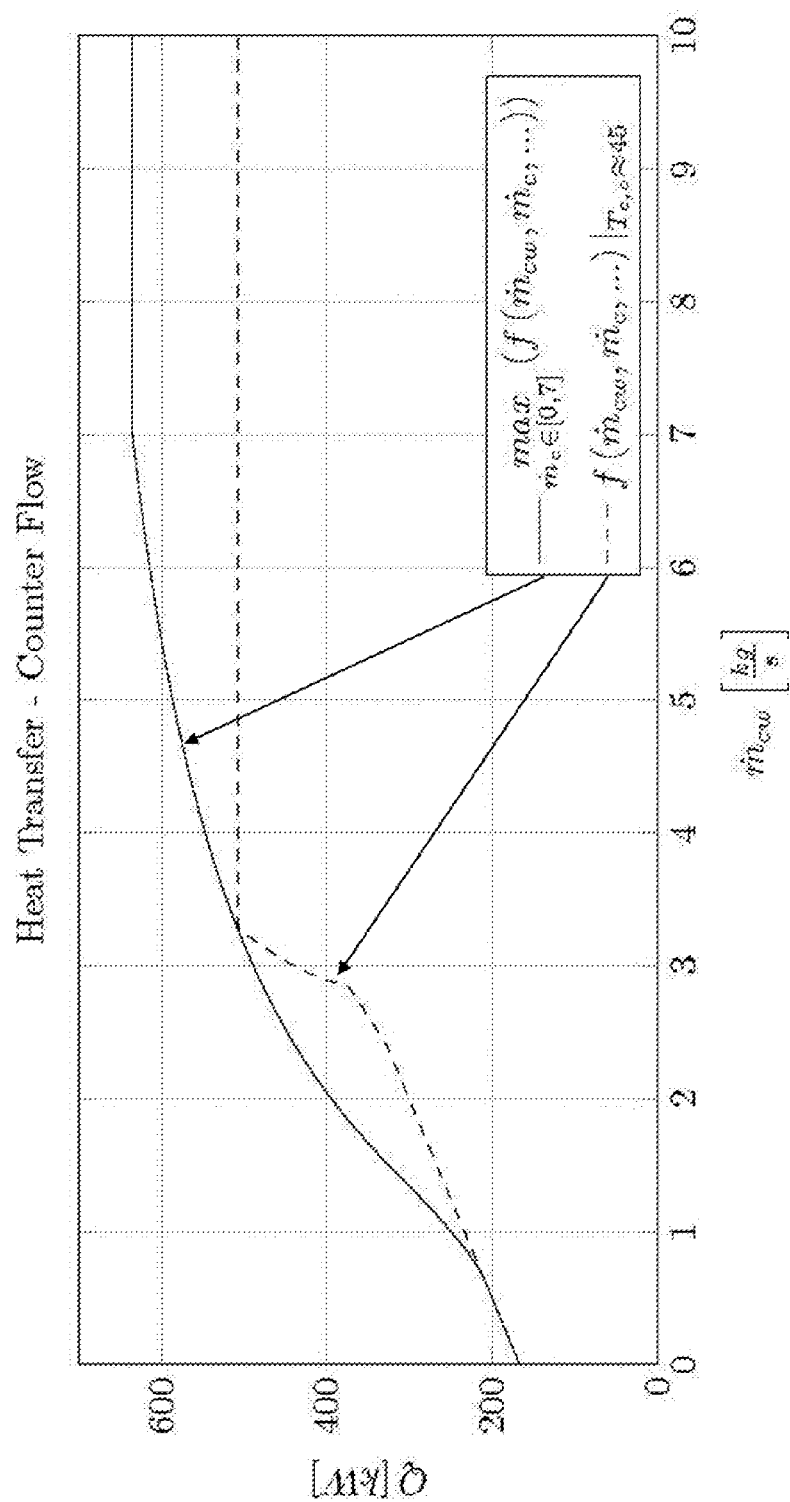

FIGS. 7A and 7B show Q in a counter flow heat exchanger for increasing $dm_{cw}/dt$ with the aforementioned parameters, and the full line curve is $$dm_c/dt=\max(Q) \text{ [kg/s]}$$

$$dm_c/dt \in \{0,7\}$$

according to the invention, the {0,7} denoting the interval from 0 to 7 kg/s.

It is not trivial to select the optimal flow as the flow and temperature are mutually dependent and both affect the heat transfer rate of the heat exchanger, i.e.;

$$T_c = \begin{cases} \dfrac{T_{cw}\dot{m}_{cw} + T_t(\dot{m}_c - \dot{m}_{cw})}{\dot{m}_c} & \text{if } \dot{m}_c > \dot{m}_{cw} \\ T_{cw} & \text{if } \dot{m}_c \leq \dot{m}_c \end{cases}$$

These variables can be found in FIGS. 6A and 6B.

Also shown in FIG. 7A is $dm_c/dt=7$ [kg/s] resulting in non-optimum heat transfer in a central region of incoming fluid mass flow rate, $dm_{cw}/dt$. Further, the fluid mass flow rate being equal to the incoming fluid mass flow rate; $dm_c/dt=dm_{cw}/dt$, is also shown resulting in a non-optimum heat transfer at a lower and higher value of incoming fluid mass flow rate, $dm_{cw}/dt$. This is to illustrate the difference in Q between using full pump speed, and an optimized pump speed to control $dm_c/dt$. Here the maximum pump speed is set to correspond to 7 [kg/s]. Notice that for $dm_c/dt=dm_{cw}/dt$-curve above 7 kg/s, the simulation is of a theoretical character and not achievable in practice due to the pump limitation.

FIG. 7B is graph similar to FIG. 7A showing the modelled heat transfer, Q, as a function of the incoming fluid mass flow rate, $dm_{cw}/dt$, the curve according to the present invention again being shown as a full line.

One other control algorithm is included in FIG. 7B for illustrating the advantages of the present invention:

The curve with the temperature of water exiting the outlet 10b of the heat exchanging unit HX, $T_{c,0}$=45 deg. C., cf. FIGS. 6A and 6B, corresponds to a control algorithm where this outlet temperature is used as control target. Generally, this will not result in an optimum heat transfer as seen in FIG. 7B. This control target is only approximately fulfilled at the upper range of incoming fluid mass flow rate because the demand will eventually be higher than what can be delivered by the heat exchanging unit in this specific configuration.

Figure 8A:
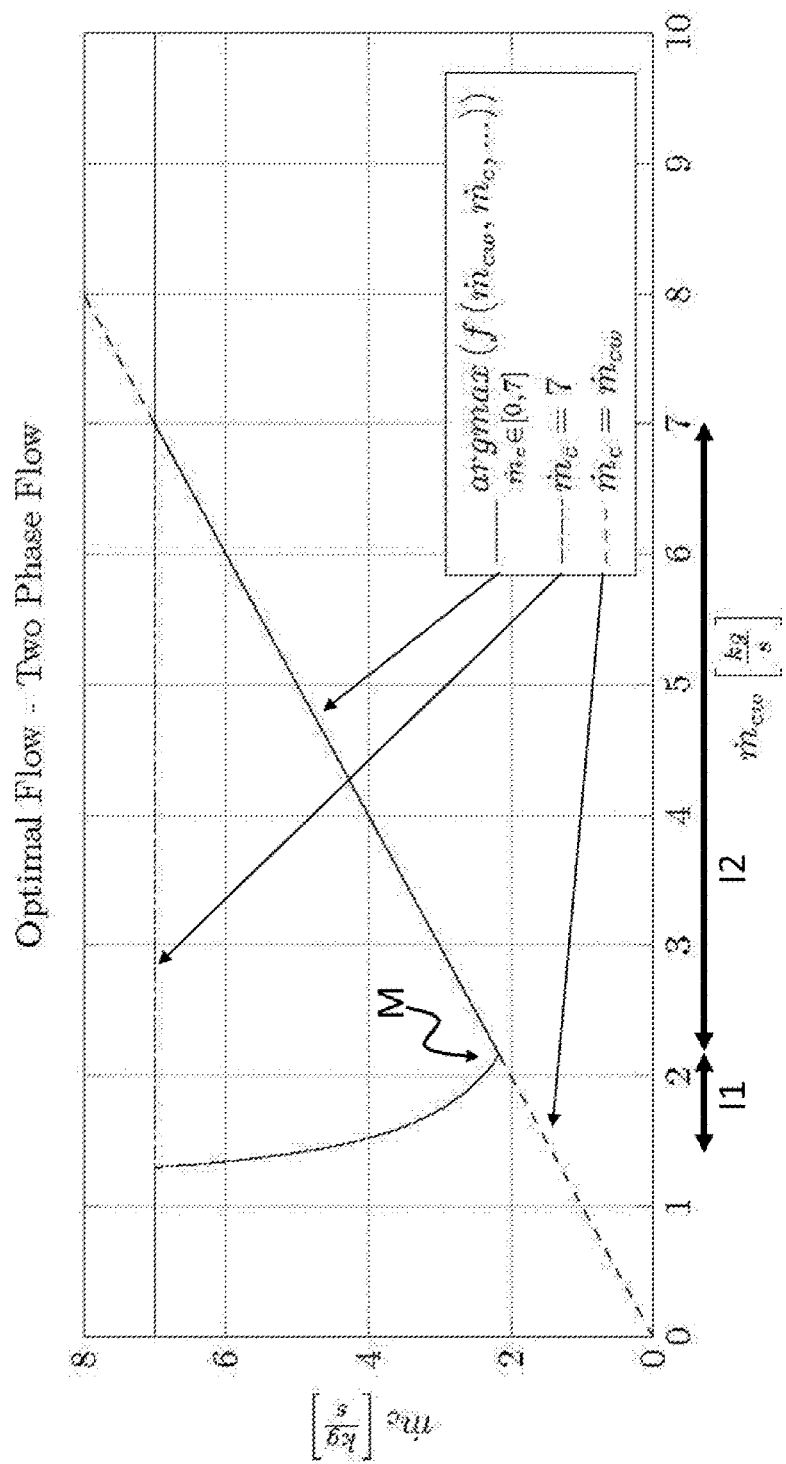
FIGS. 8A and 8B are graphs showing the modelled fluid mass flow rate of the pump, $dm_c/dt$, as a function of the incoming fluid mass flow rate, $dm_{cw}/dt$, for different scenarios, including the flow with maximized heat transfer (full line) according to the present invention.
Figure 8B:
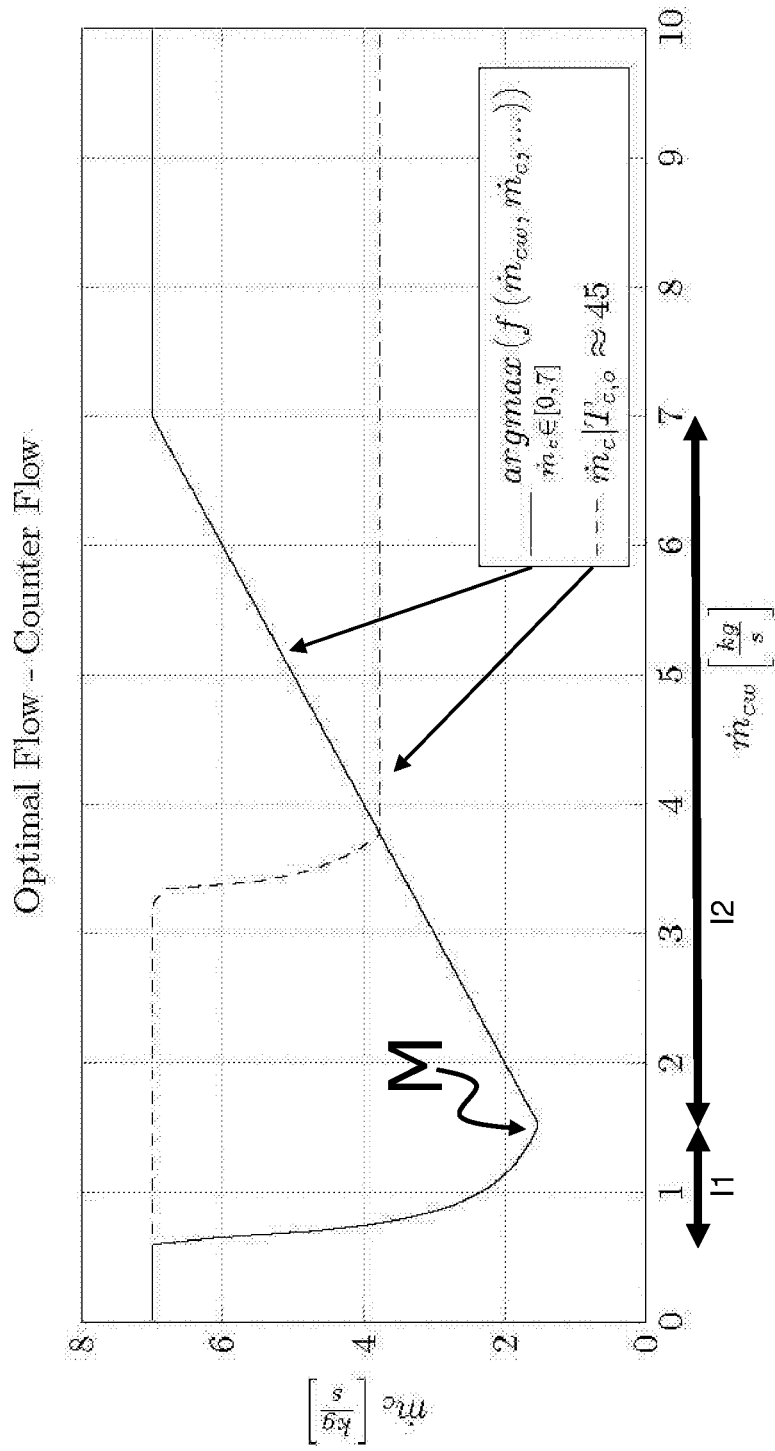

FIGS. 8A and 8B are graphs showing the modelled fluid mass flow rate of the pump, $dm_c/dt$, as a function of the incoming fluid mass flow rate, $dm_{cw}/dt$, for different scenarios, including the flow with maximized heat transfer (full line) according to the present invention. Thus, FIG. 8A corresponds to the FIG. 7A, and FIG. 8B corresponds to the FIG. 7B.

As seen in FIG. 8A and FIG. 8B—at least within a finite interval, named I1 and I2, of incoming fluid mass flow rate, $dm_{cw}/dt$—the transferred heat, Q, is maximized for an interval of fluid mass flow rate, $dm_c/dt$, by controlling the pump P, or P1, in response to said information indicative of the transferred heat, Q, to the fluid as explained above. The fluid mass flow rate, $dm_c/dt$, delivered by the pump thereby has a minimum M as a function of the incoming fluid mass flow rate, $dm_{cw}/dt$, when maximizing the transferred heat in said finite interval as explained above. The minimum M is positioned between the two sub-intervals I1 and I2, the minimum having a point-like character in the graphs.

It is noted in FIGS. 8A and 8B, that the heat transfer Q is also being maximized outside of the finite interval I1 and I2 by operating the pump at the maximum of fluid mass flow rate, $dm_c/dt,max$, deliverable by the pump, P or P1, the maximum in this particular case being 7 kg/s.

The figure shows how the optimal $dm_c/dt$ is significantly lower than its maximum value. It also shows that the optimal $dm_c/dt$ is not simply related with $dm_{cw}/dt$. For low $dm_{cw}/dt$, more heat transfer occurs, if the water is drawn from the hot fluid tank, the more the better. As $dm_{cw}/dt$ increases, it's low temperature becomes more attractive than the high flow which can be drawn from the tank HFT. Quite quickly the optimal $dm_c/dt$ becomes equal to $dm_{cw}/dt$, even though the flow is rather low. This continues to be the optimal solution until the pump speed is saturated and runs at maximum speed again. The exact optimal curve with maximum heat transfer varies drastically with changed operating parameters. The colder the incoming city water is in relation to the temperature of water in the tank, the more favorable the unmixed city water is and therefore lower flows. The larger the heat exchanger (larger U·A), the more the high flow rates are favorable. The lower the flow on the secondary side, the more favorable is the low city water temperature. The modeling of FIGS. 7 and 8 have been repeated for other heat exchanger configurations, e.g. parallel flow; however the conclusions are the same.

It is also noted that when controlling the pump at a maximum of heat transfer Q—at the lower end I1 of the interval—one obtains a mass flow rate, $dm_c/dt$, which is decreasing as a function of the incoming fluid mass flow rate, $dm_{cw}/dt$, and the resulting mass flow rate being larger than the incoming fluid mass flow rate thereby results in a non-vanishing back flow BF of heated fluid, e.g. water, from the hot fluid tank HFT through the common junction 6a.

After reaching the minimum value M of fluid mass flow rate, the control according to the invention results in an increasing fluid mass flow rate, $dm_c/dt$, at the higher end I2 of the interval as a function of the incoming fluid mass flow rate $dm_{cw}/dt$, especially an increasing fluid mass flow rate being substantially the same as the incoming fluid mass flow rate.

In FIG. 6B, some control and sensing means, e.g. temperature sensors and flow meters, for implementing the invention are shown, however for practical implementation a more limited selection of sensing means may be applied. In FIGS. 9-12, and the corresponding description below, some possible implementations are shown.

Figure 9:
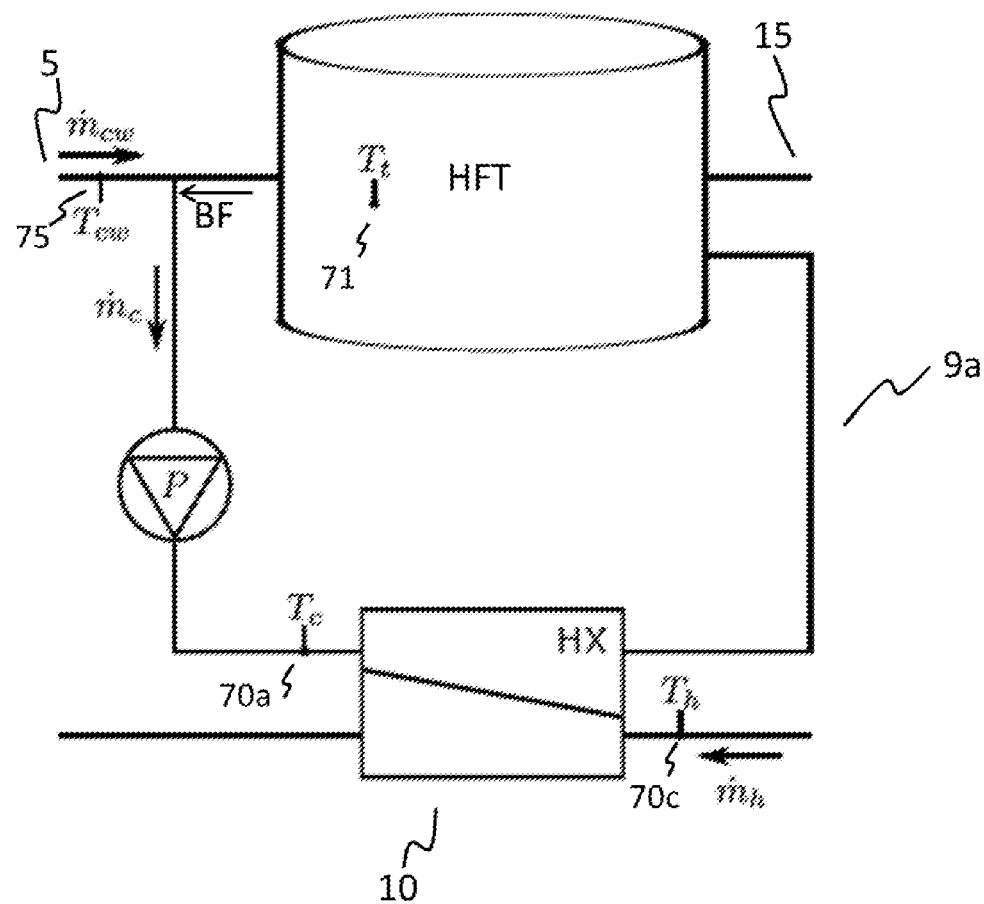
FIG. 9 is a schematic drawing of a portion of a heating system where a feed-forward control according to the present invention is implemented.

FIG. 9 is a schematic drawing of a portion of a heating system 100 where a feed-forward control according to the present invention is implemented.

One way of determining the optimal $dm_c/dt$ would be to have information of all the parameters of the function f above, and then calculate the optimal $dm_c/dt$ for the given parameters. This can be attempted in closed form, but can be computationally challenging, or it can be done numerically. Either way, it requires four temperature sensors and three flow measurements, along with knowledge of the U·A value of the heat exchanger and the specific heat capacities of both the fluid F and medium R. It also requires knowledge of the specific heat exchanger configuration (counter flow, parallel flow, cross flow). Due to this it may be impractical to do it this way. The required values are shown in FIG. 9, where three flow meters can measure $dm_{cw}/dt$, $dm_c/dt$ and $dm/dt$, respectively, cf. FIG. 6B for corresponding flow meters, and four temperature measurements $T_{cw}$, $T_t$, $T_c$, and $T_h$ are made using corresponding sensors 75, 71, 70a, and 70b, respectively.

Figure 10A:
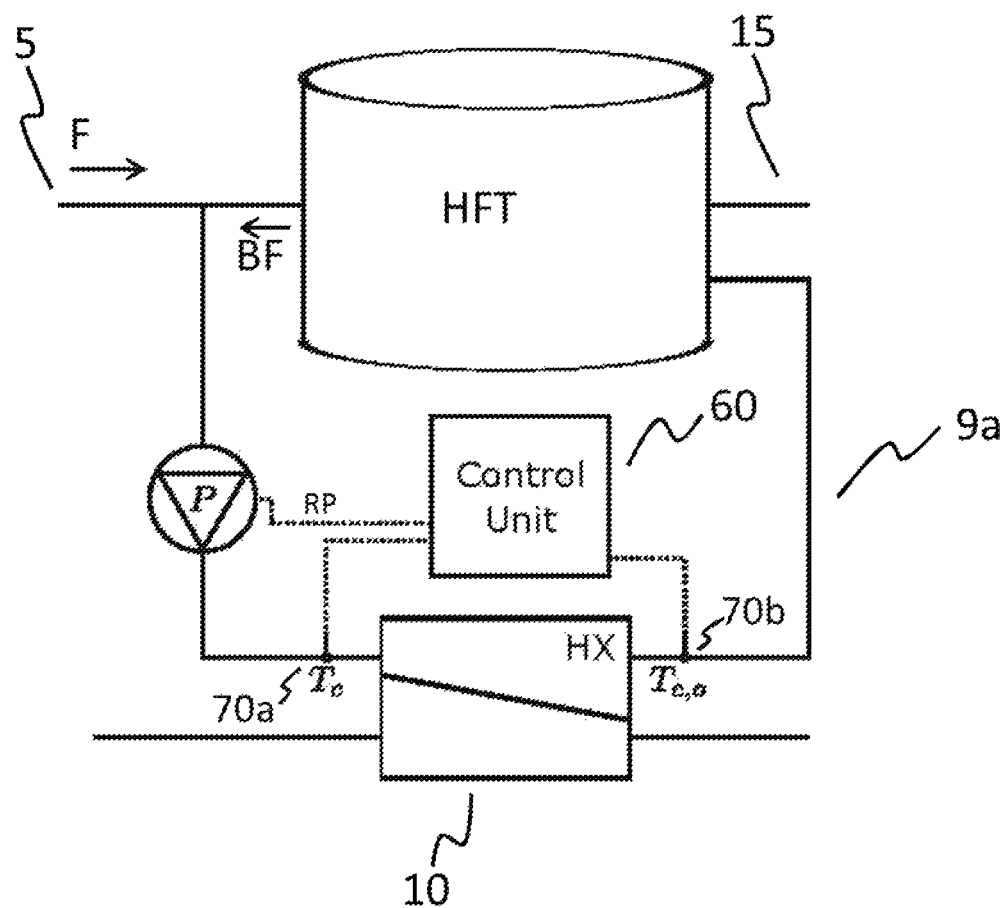
FIGS. 10A and 10B are schematic drawings of a portion of a heating system where a continuous feedback control according to the present invention is implemented.
Figure 10B:
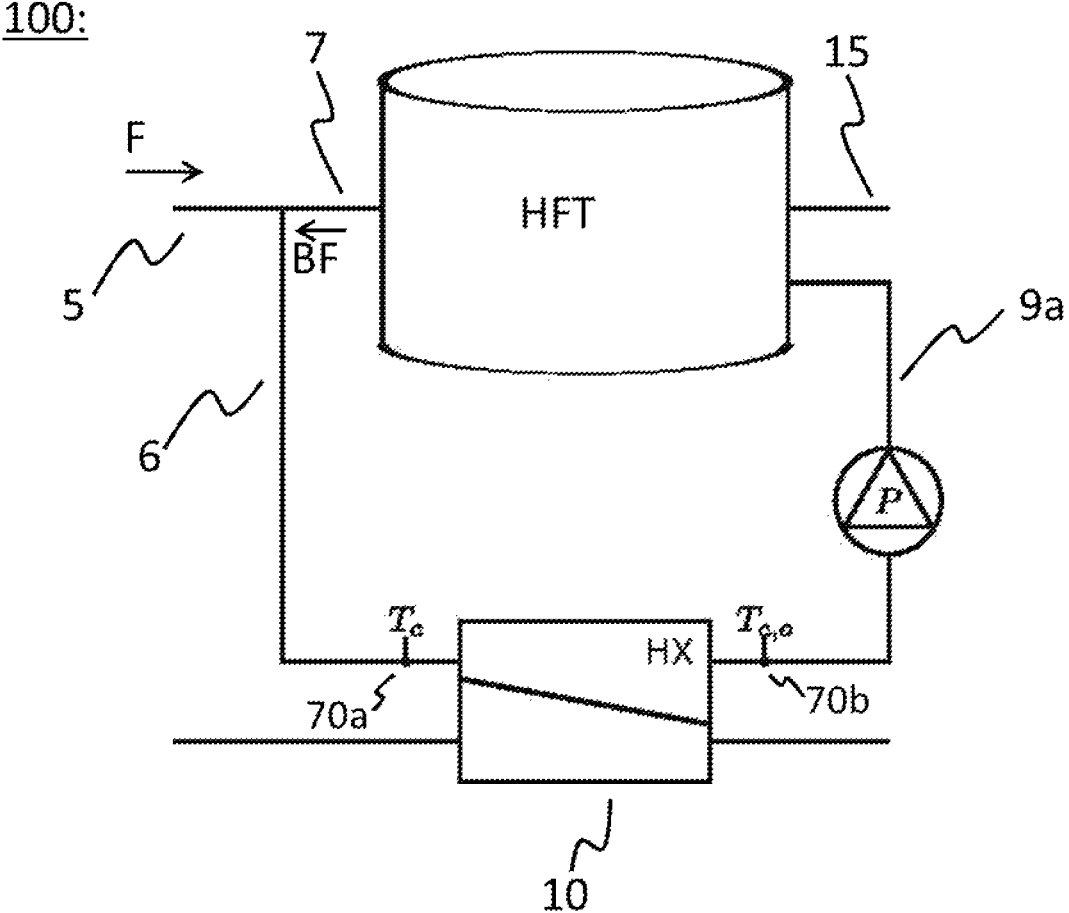

FIGS. 10A and 10B are schematic drawings of a portion of a heating system 100 where a continuous feedback control according to the present invention is implemented. In this embodiment, one uses the knowledge that there exist an optimal $dm_c/dt$ i.e. between zero and $dm_c/dt,max$, and then search for it by perturbing $dm_c/dt$ and see if the measured Q changes negatively or positively. $dm_c/dt$ is then changed in the direction that maximizes Q. The procedure is then repeated over and over. This approach automatically takes all factors into account. However, the effects of the pertubations in $dm_c/dt$ on Q may vanish due to the effects of changes in some of the other variables affecting Q. Therefore, the adaptation of $dm_c/dt$ should be rather slow, so intermediate effects of changing conditions does not affect $dm_c/dt$ greatly. It should still be fast enough, however, to be responsive to more long lasting effects which are changing the conditions. Q can be estimated using the measurements $T_c$ and $T_{c,o}$ combined with a measurement of $dm_c/dt$, or estimate of it, using knowledge of the pump parameters. The estimate does not need to be very accurate, since it is only used to determine the direction of $dm_c/dt$. These sensors are shown in FIG. 10, excluding the possible flow sensor. Thus, the maximization of transferred heat Q is performed in a continuous feedback control regime by iteratively changing the mass flow rate $dm_c/dt$ of the pump, P1 or P, and monitoring by temperature sensors 70a and 70b, it is possible to measure, or estimate, the corresponding effect on the transferred heat Q.

FIG. 10B differs from FIG. 10A in that the pump P is positioned after the heat exchanging unit HX i.e. in the fluid conduction means 9a. This, however, does not alter the basic principle of the invention. Similarly, the position of the pump, P or P1, in the other embodiments of the present invention may be changed to another position relative to the heat exchanging unit, HX or HX1, as long as the pump is capable of driving the fluid through the unit.

Figure 11:
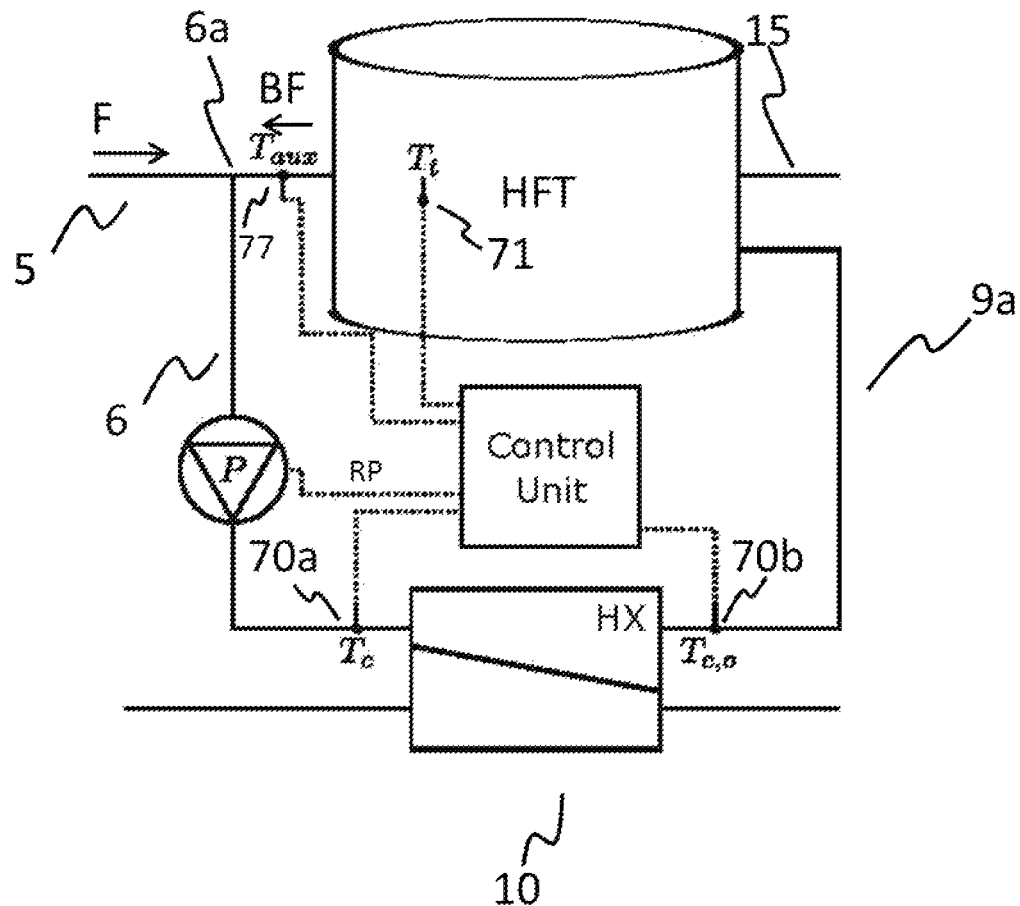
FIG. 11 is a schematic drawing of a portion of a heating system where a logical feedback control according to the present invention is implemented.

FIG. 11 is a schematic drawing of a portion of a heating system 100 where a logical feedback control according to the present invention is implemented. Most of the time $dm_c/dt=dm_{cw}/dt$, or $dm_c/dt=dm_c/dt,max$, and when $dm_c/dt,max>dm_c/dt^*>dm_{cw}/dt$, the optimum is very vague, meaning that the $dm_c/dt=dm_c/dt^*$ is not significantly better than $dm_c/dt=dm_{cw}/dt$, or $dm_c/dt=dm_c/dt,max$ in terms of Q. Therefore, it would be close to optimal to only switch between these two values. It is trivial to achieve $dm_c/dt=dm_c/dt,max$, however, it can be hard to achieve $dm_c/dt=dm_{cw}/dt$ since it requires some measurement of the incoming fluid mass flow rate. This could be done in many ways, e.g. using flow meters. However, a very simple way of obtaining the needed information is to measure the temperature in the pipe supplying the hot fluid tank HFT with city water. The temperature sensor 77 is shown in FIG. 11 where it measures $T_{aux}$. If $T_{aux} \rightarrow T_{cw}$ one knows that $dm_c/dt<dm_{cw}/dt$ and, similarly, if $T_{aux} \rightarrow T_t$ one knows that $dm_c/dt>dm_{cw}/dt$. This information can then be used to keep $dm_c/dt$ close to $dm_{cw}/dt$ by controlling the pump P and hence $dm_c/dt$. The algorithm thus determines whether to change flow by perturbing $dm_c/dt$ continuously and analyzing the measured heat transfer rate.

Thus, the maximization of transferred heat Q is performed in a logical feedback control regime by either operating the pump P at the maximum rated mass flow rate, $dm_c/dt,max$, or operating the pump at a mass flow rate, $dm_c/dt$, equal to incoming fluid flow mass rate, $dm_{cw}/dt$, the incoming fluid flow mass rate being estimated by either a flow meter 85 in the fluid inlet line (not shown in FIG. 11 but in FIG. 6B), and/or the flow direction being indirectly estimated based on a temperature sensor 77 in between the said common junction 6a and the hot fluid tank HFT by comparison with the temperature of the incoming fluid, $T_{cw}$.

Figure 12:
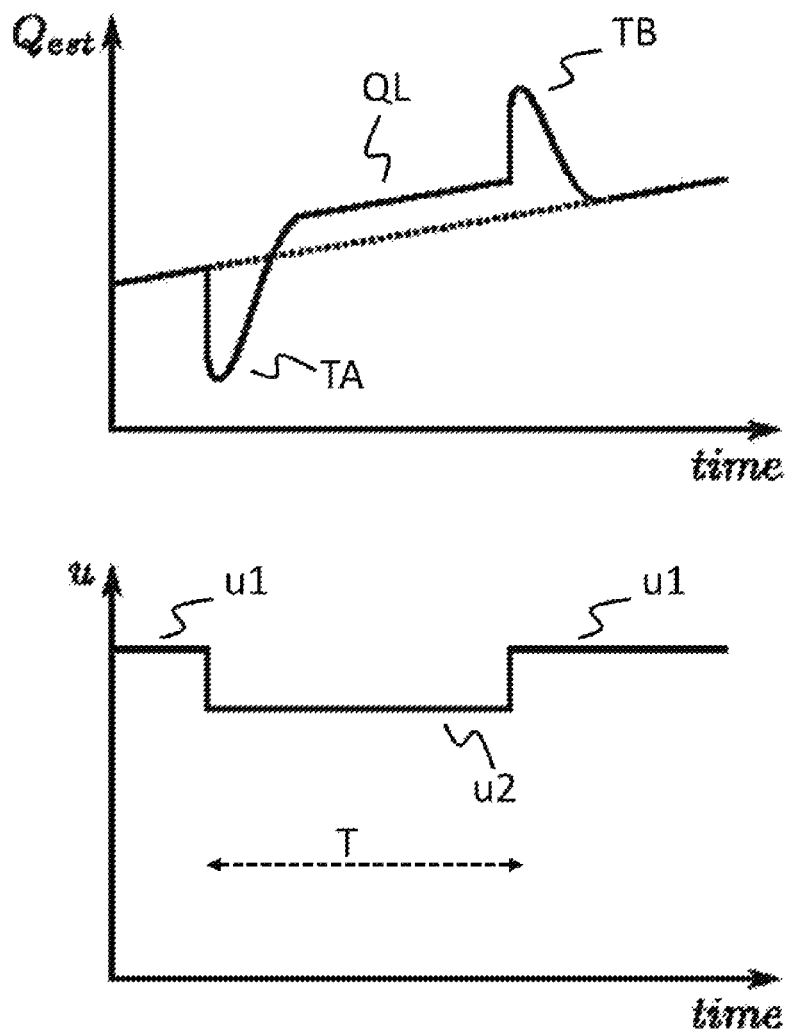
FIG. 12 shows a graph of the estimated heat transfer ($Q_{est}$) as a function of time, and a corresponding graph of the rotational speed (u) of an impeller in a centrifugal pump as a function of time according to the present invention.

FIG. 12 shows a graph of the estimated heat transfer $Q_{est}$ as a function of time, and a corresponding graph of the rotational speed u of an impeller in a centrifugal pump P as a function of time according to the present invention. This embodiment can be implemented with the heating system 100 shown in FIG. 11. The issue is to determine what effect a change in rotational speed u of the impeller will have on the transferred heat Q.

This heat can be estimated by realizing that $$Q_{est}=k*u*[T_{c,0}-T_c]$$

where the constant k includes the heat capacity of water and the mapping between u and $dm_c/dt$. However, it is only important, if Q is increasing or decreasing, hence the estimate $Q_{est}$ may be applied.

In FIG. 12, the pump is initially operated at the maximum impeller speed u1 and hence maximum $dm_c/dt$, and for a period of time T, the pump is then operated at a lower impeller speed u2. Upon changing from u1 to u2, the heat transferred will experience a transient TA, but will shortly thereafter reach a steady state level QL, in this case a constantly increasing steady state level. Upon changing the impeller speed back to the u1 level, the transferred heat will have yet another transient TB before the original level of heat transferred is reached again, in this case a constantly increasing level. By choosing the period T long enough the transients TA and TB will cancel each other and thereby have a relatively low impact on the average value of $Q_{est}$.

If the average of $Q_{est}$ in the period T is higher than the average value before and/or after the period, it is worth changing impeller speed to u2. Thus, the maximization of transferred heat, $Q_{est}$, is performed by changing the mass flow rate, $dm_c/dt$, of the pump and monitoring the corresponding effect on the transferred heat by averaging over a period of time T sufficiently long enough to reach a steady state of transferred heat with respect to the mass flow rate of the pump. Notice that the steady state level could also be a constant level, or alternatively a constantly decreasing level.

Figure 13:
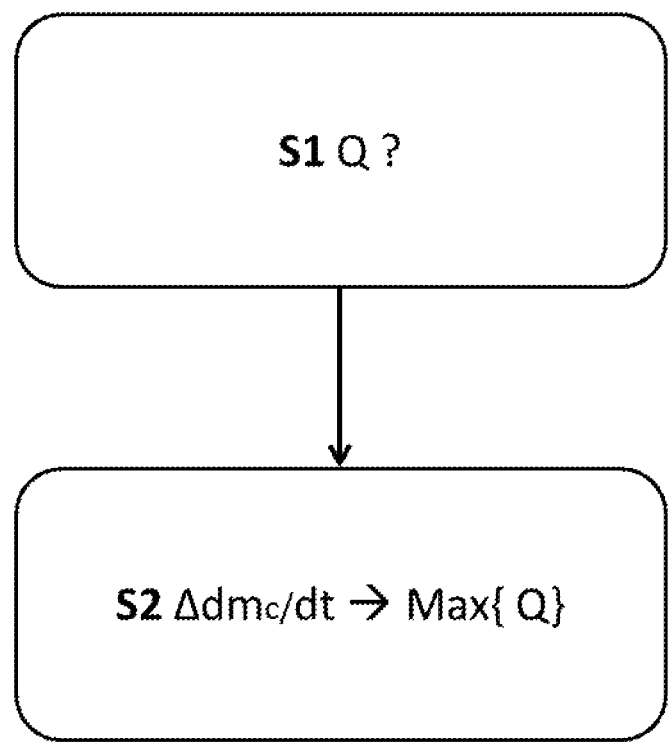
FIG. 13 is a schematic flow chart of a method according to the invention.

FIG. 13 is a schematic flow chart of a method according to the invention. The method comprising the steps of S1 providing information indicative IQ of a transferred heat Q in the heat exchanging unit, HX1 or HX, cf. FIGS. 2-12, to the fluid F, and S2 maximizing the transferred heat Q to the fluid F by controlling the pump, P1 or P, in response to this information IQ, the fluid mass flow rate, $dm_c/dt$, delivered by the pump thereby having a minimum as a function of the incoming fluid mass flow rate, $dm_{cw}/dt$, when maximizing the transferred heat.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

In short, the present invention relates to a method for controlling a pump for feeding fluid F into a heating system 1000. The heating system has a hot fluid tank HFT receiving fluid from an associated fluid reservoir line 5 with an incoming fluid mass flow rate, $dm_{cw}/dt$. A pump P receives fluid from the line, and pumps the received fluid with a mass flow rate, $dm_c/dt$. A heat exchanging unit HX transfers heat Q to the fluid F from a medium R. The transferred heat Q is maximized by controlling the pump P1 in response to this information indicative of the transferred heat Q, the fluid mass flow rate delivered by the pump thereby having a minimum as a function of the incoming fluid mass flow rate, $dm_{cw}/dt$, when maximizing the transferred heat. The invention provides significantly improved heat transfer to the fluid and power savings for the pump. The invention also relates to a heating system, e.g. a heat pump system.

LIST OF REFERENCE NUMERALS 5 reservoir line
6a common junction
6, 7, 8, 9a, 9b, 15 fluid conduction means
10, 20, 30, 40 heat exchanging units
10a, 10b, 10c, 10d inlets and outlets on heat exchanging unit
50 refrigerant line
51 compressor
52 expansion valve
60 control unit
80, 85, 86 flow meters
100 heat pump system
70a, 70b, 70c, 70d, 71, 75, 77 temperature sensors
200 condensing boiler heating system
210 condensing boiler
270a, 270b, 271, 277 temperature sensors
300 solar-based heating system
340 solar panel
370a, 370b, 377 temperature sensors
1000 heating system
BF back flow
$dm_c/dt$ fluid mass flow rate delivered by pump
$dm_{cw}/dt$ incoming fluid mass flow rate
F fluid
HX, HX1, HX2, HX3 heat exchanging units
I1, I2 interval of incoming fluid mass flow rate
P, P1, P2, P3 pumps
V valve
R medium or refrigerant

The invention claimed is:

1. A method for controlling a pump for feeding fluid into a heating system, the heating system comprising:
    a hot fluid tank, the hot fluid tank receiving fluid from an associated fluid reservoir line with an incoming fluid mass flow rate,
    a pump, the pump also receiving fluid from the said fluid reservoir line, and pumping received fluid with a variable fluid mass flow rate, the pump and the hot fluid tank receiving fluid from a common junction on said associated fluid reservoir line, and
    a heat exchanging unit, the heat exchanging unit receiving fluid from the associated fluid reservoir line driven by the pump, and transferring heat to the fluid from a medium, and
    a control unit, the method comprising:
    providing information indicative of a transferred heat in the heat exchanging unit to the fluid to the control unit, and
    with the control unit, controlling the pump in response to said information indicative of the transferred heat to the fluid at least within a finite interval of the incoming fluid mass flow rate, minimizing a fluid mass flow rate delivered by the pump as a function of the incoming fluid mass flow rate when optimizing the transferred heat in said finite interval by solving for the mass flow rate of the pump in a feed-forward control regime: $Q=f(T_{cw}, T_t, T_h, dm_c/dt, dm_h/dt, dm_{cw}/dt, U, A, cp_c, cp_h)$
    wherein:
    Q is the mass flow rate of the pump,
    $T_{cw}$ is an estimated, or measured, temperature of the incoming fluid,
    $T_t$ is an estimated, or measured, temperature of fluid in the hot fluid tank,
    $T_h$ is an estimated, or measured, temperature of the medium at the inlet of the heat exchanging unit,
    $dm_c/dt$ is the mass flow rate delivered by the pump,
    $dm_h/dt$ is the mass flow rate of the medium at the inlet of the heat exchanging unit,
    $dm_{cw}/dt$ is the estimated, or measured, mass flow rate of the incoming fluid,
    U is a heat transfer coefficient per area of the heat exchanging unit,
    A is an effective area for a heat transfer of the heat exchanging unit,
    $cp_c$ is a heat capacity of the fluid, and
    $cp_h$ is a heat capacity of the medium.

2. The method according to claim 1, wherein the transferred heat is also optimized outside of said finite interval by operating the pump at a maximum of the fluid mass flow rate deliverable by the pump.

3. The method according to claim 1, wherein controlling the pump at a maximum of the transferred heat—at a lower end of said interval—is resulting in the fluid mass flow rate decreasing as a function of the incoming fluid mass flow rate, and a resulting fluid mass flow rate being larger than the incoming fluid mass flow rate thereby resulting in a back flow of heated fluid from the hot fluid tank through the said common junction.

4. The method according to claim 3, wherein controlling the pump at said maximum of the transferred heat—at a higher end of said interval—is resulting in an increasing fluid mass flow rate as a function of the incoming fluid mass flow rate.

5. The method according to claim 4, wherein controlling the pump—at the higher end of said interval—is resulting in an increasing mass flow rate being substantially the same as the incoming fluid mass flow rate.

6. The method according to claim 1, wherein providing information indicative of a transferred heat in the heat exchanging unit to the fluid is performed based on input from at least two temperature sensors at an inlet and/or an outlet of the heat exchanging unit at a primary side and/or at a secondary side of said heat exchanging unit.

7. The method according to claim 6, wherein an optimization of transferred heat is performed in a continuous feedback control regime by iteratively changing the mass flow rate of the pump and monitoring a corresponding effect on the transferred heat.

8. The method according to claim 6, wherein an optimization of transferred heat is performed in a logical feedback control regime by either operating the pump at the maximum rated mass flow rate, or operating the pump at a mass flow rate equal to the incoming fluid flow mass rate, the incoming fluid flow mass rate being estimated by either a flow meter in a fluid inlet line, and/or the flow direction being indirectly estimated based on a temperature sensor in between the said common junction and the hot fluid tank by comparison with the temperature of the incoming fluid.

9. The method according to claim 6, wherein an optimization of transferred heat is performed by changing the mass flow rate of the pump and monitoring a corresponding effect on the transferred heat by averaging over a period of time sufficient to reach a steady state of transferred heat with respect to the mass flow rate of the pump.

10. The method according to claim 1, wherein providing information indicative of a transferred heat in the heat exchanging unit to the fluid is performed based on input from one or more temperature sensors at an inlet of and/or within the hot fluid tank.

11. The method according to claim 1, wherein providing information indicative of a transferred heat in the heat exchanging unit to the fluid is performed based on input from one or more flow meters.

12. The method according to claim 1, wherein providing information indicative of a transferred heat in the heat exchanging unit to the fluid is performed based on input from one or more parameters related to a power consumption of the heating system.

13. The method according to claim 1, wherein providing information indicative of a transferred heat in the heat exchanging unit to the fluid is performed based on input from one or more flow meters for measuring the incoming fluid mass flow rate from said fluid reservoir line, and a medium mass flow rate through the primary side of the heat exchanging unit.

14. The method according to claim 1, wherein providing information indicative of a transferred heat in the heat exchanging unit to the fluid is performed based on input from one or more flow meters for measuring the incoming fluid mass flow rate from said fluid reservoir line, or a medium mass flow rate through the primary side of the heat exchanging unit.

15. The method according to claim 11, wherein the pump is applied as an indirect flow meter by utilising characteristics about the pump and one or more applied control parameters for operating the pump.

16. The method according to claim 1, wherein providing information indicative of a transferred heat in the heat exchanging unit to the fluid is performed based on input from one or more parameters related to a power consumption of a compressor compressing a refrigerant in a heat pump system.

17. The method according to claim 1, wherein the heating system comprises a heat pump system, the heat pump system comprising a refrigerant line with said heat exchanging unit, a second, and a third exchanging unit being interconnected,
the heat exchanging unit receiving fluid from the pump, and performing sub-cooling of a refrigerant so as to transfer heat to the fluid,
the second exchanging unit performing super-heating of said refrigerant so as to transfer heat to the fluid, and
the third exchanging unit receiving the refrigerant from said second exchanging unit and performing condensation of said refrigerant, and conveying the cooled refrigerant to the heat exchanging unit.

18. The method according to claim 1, wherein the heating system comprises a condensing boiler system, the condensing boiler system comprising a condensing boiler unit where a combustion process together with a subsequent condensation of water from the combustion process is transferring heat to the fluid.

19. The method according to claim 1, wherein the heating system comprises a solar-based heating system, the solar-based heating system comprising a solar panel where solar radiation heats a medium being driven to the heat exchanging unit.

20. The method according to claim 1, wherein the fluid is city water, and the fluid reservoir line is a city water line.

21. A computer system for controlling a heating system according to the method of claim 1, the computer system comprising:
a computer;
a data storage means connected to said computer;
wherein said computer is adapted to receive information indicative of the transferred heat to the fluid and wherein said computer is adapted to control the pump in response to the information indicative of the transferred heat to the fluid to optimize the transferred heat according to the method of claim 1.

22. A method for controlling a pump for feeding fluid into a heating system, the heating system comprising:
a hot fluid tank, the hot fluid tank receiving fluid from an associated fluid reservoir line with a given incoming fluid mass flow rate,
a pump, the pump also receiving fluid from the said fluid reservoir line, and pumping the received fluid with a variable mass flow rate, the pump and the hot fluid tank receiving fluid from a common junction on said associated fluid reservoir line,
a heat exchanging unit, the heat exchanging unit receiving fluid from the associated fluid reservoir line driven by the pump, and transferring heat to the fluid from a medium, and
a control unit, the method comprising:
providing information indicative of a transferred heat in the heat exchanging unit to the fluid to the control unit, with the control unit, controlling the pump to optimize the transferred heat in response to the information indicative of the transferred heat, wherein the pump is operated with a first interval where the pump is controlled to mix fluid from the fluid reservoir line and the hot fluid tank, and a second interval in which the pump only draws fluid from the incoming fluid reservoir line, wherein the transferred heat is optimized by solving for the mass flow rate of the pump in a feed-forward control regime:

wherein:
Q is the mass flow rate of the pump,
$T_{cw}$ is an estimated, or measured, temperature of the incoming fluid,
$T_t$ is an estimated, or measured, temperature of fluid in the hot fluid tank,
$T_h$ is an estimated, or measured, temperature of the medium at the inlet of the heat exchanging unit,
$dm_c/dt$ is the mass flow rate delivered by the pump,
$dm_h/dt$ is the mass flow rate of the medium at the inlet of the heat exchanging unit,
$dm_{cw}/dt$ is the estimated, or measured, mass flow rate of the incoming fluid,
U is a heat transfer coefficient per area of the heat exchanging unit,
A is an effective area for a heat transfer of the heat exchanging unit,
$cp_c$ is a heat capacity of the fluid, and
$cp_h$ is a heat capacity of the medium.

23. A heating system comprising:
a hot fluid tank, the hot fluid tank receiving fluid from an associated fluid reservoir line with an incoming fluid mass flow rate,
a pump, the pump also receiving fluid from the said fluid reservoir line, and pumping the received fluid with a mass flow rate, the pump and the hot fluid tank receiving fluid from a common junction on said associated fluid reservoir line, and
a heat exchanging unit, the heat exchanging unit receiving fluid from the associated fluid reservoir line driven by the pump and transferring heat to the fluid, and
a control unit, the control unit being connected to the pump for variably controlling the mass flow rate, the control unit receives information indicative of a transferred heat in the heat exchanging unit to the fluid,
wherein the said transferred heat is optimized by controlling the pump in response to said information indicative of the transferred heat to the fluid at least within a finite interval of incoming fluid mass flow rate to minimize a fluid mass flow rate delivered by the pump as a function of the incoming fluid mass flow rate when optimizing the transferred heat in said finite interval, wherein the control unit solves for the mass flow rate of the pump in a feed-forward control regime: $Q=f(T_{cw}, T_t, T_h, dm_c/dt, dm_h/dt, dm_{cw}/dt, U, A, cp_c, cp_h)$
wherein:
Q is the mass flow rate of the pump,
$T_{cw}$ is an estimated, or measured, temperature of the incoming fluid,
T is an estimated, or measured, temperature of fluid in the hot fluid tank,
$T_h$ is an estimated, or measured, temperature of the medium at the inlet of the heat exchanging unit,
$dm_c/dt$ is the mass flow rate delivered by the pump,
$dm_h/dt$ is the mass flow rate of the medium at the inlet of the heat exchanging unit,
$dm_{cw}/dt$ is the estimated, or measured, mass flow rate of the incoming fluid,
U is a heat transfer coefficient per area of the heat exchanging unit,
A is an effective area for a heat transfer of the heat exchanging unit,
$cp_s$ is a heat capacity of the fluid, and
$cp_h$ is a heat capacity of the medium.

24. The heating system of claim 23, further comprising a computer having a data storage means, wherein the computer is adapted to receive said information indicative of the transferred heat to the fluid and wherein said computer is also adapted to control the pump in response to said information indicative of the transferred heat to the fluid.

\* \* \* \* \*

UNITED STATES PATENT AND TRADEMARK OFFICE
CERTIFICATE OF CORRECTION

| | |
|---|---|
| PATENT NO. | : 10,527,294 B2 |
| APPLICATION NO. | : 15/029309 |
| DATED | : January 7, 2020 |
| INVENTOR(S) | : Casper Hillerup Lyhne |

It is certified that error appears in the above-identified patent and that said Letters Patent is hereby corrected as shown below:

In the Claims

Column 22, Line 50, first word replace "T" with --$T_t$--

Signed and Sealed this
Twenty-fifth Day of February, 2020

Andrei Iancu
*Director of the United States Patent and Trademark Office*